United States Patent
Lee et al.

(10) Patent No.: US 12,185,278 B2
(45) Date of Patent: *Dec. 31, 2024

(54) METHOD AND APPARATUS FOR PAGING PROCEDURES IN NEW RADIO (NR)

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,052

(22) Filed: Oct. 10, 2023

(65) Prior Publication Data
US 2024/0049180 A1 Feb. 8, 2024

Related U.S. Application Data

(63) Continuation of application No. 17/892,289, filed on Aug. 22, 2022, now Pat. No. 11,825,444, which is a (Continued)

(51) Int. Cl.
*H04W 68/00* (2009.01)
*H04W 24/10* (2009.01)
(Continued)

(52) U.S. Cl.
CPC .......... *H04W 68/02* (2013.01); *H04W 24/10* (2013.01); *H04W 48/10* (2013.01); *H04W 74/0833* (2013.01)

(58) Field of Classification Search
CPC ..... H04W 68/02; H04W 24/10; H04W 48/10; H04W 74/0833; H04W 68/025; H04W 88/02; H04W 68/06
(Continued)

(56) References Cited

U.S. PATENT DOCUMENTS

| 6,418,104 B1 | 7/2002 | Sato et al. |
| 8,036,669 B2 | 10/2011 | Dong et al. |

(Continued)

FOREIGN PATENT DOCUMENTS

| CN | 102934383 A | 2/2013 |
| CN | 104734758 A | 6/2015 |

(Continued)

OTHER PUBLICATIONS

R1-1702829 , "Discussion on Paging Design for NR", NTT DOCOMO, INC., 3GPP TSG RAN WG1 Meeting #88, Feb. 13-17, 2017, 5 pages.

(Continued)

*Primary Examiner* — Amancio Gonzalez
(74) *Attorney, Agent, or Firm* — Flaster Greenberg, P.C.

(57) ABSTRACT

Methods and apparatuses are described herein for paging procedures in wireless systems. For example, a wireless transmit receive unit (WTRU) may monitor one or more physical downlink control channels (PDCCHs) for paging resources associated with a first subset of synchronization signal (SS) blocks that corresponds to a first beam tracking area (BTA). On a condition that at least one measurement of at least one beam associated with the first subset of SS blocks is less than a predetermined threshold, the WTRU may transmit, to a base station (BS), a signal indicating a second BTA that is associated with a second subset of SS blocks. The signal includes a physical random access channel (PRACH) resource associated with a second group of SS blocks that corresponds to the second BTA.

18 Claims, 11 Drawing Sheets

Related U.S. Application Data continuation of application No. 17/087,312, filed on Nov. 2, 2020, now Pat. No. 11,470,577, which is a continuation of application No. 16/609,928, filed as application No. PCT/US2018/030968 on May 3, 2018, now Pat. No. 10,827,459.

(60) Provisional application No. 62/519,699, filed on Jun. 14, 2017, provisional application No. 62/500,706, filed on May 3, 2017.

(51) Int. Cl.
*H04W 48/10* (2009.01)
*H04W 68/02* (2009.01)
*H04W 74/0833* (2024.01)

(58) Field of Classification Search
USPC ............................................. 455/458
See application file for complete search history.

(56) References Cited

U.S. PATENT DOCUMENTS

| | | | |
|---|---|---|---|
| 8,982,693 B2 | 3/2015 | Krishnamurthy et al. | |
| 9,144,082 B2* | 9/2015 | Rubin | H04B 7/0408 |
| 9,258,798 B2 | 2/2016 | Li et al. | |
| 10,117,212 B2* | 10/2018 | Rune | H04W 60/005 |
| 10,148,337 B2* | 12/2018 | Ng | H04W 72/23 |
| 10,367,677 B2* | 7/2019 | Parkvall | H04J 11/0059 |
| 10,462,763 B2* | 10/2019 | Rune | H04W 68/06 |
| 10,505,615 B2* | 12/2019 | Islam | H04B 7/0617 |
| 10,506,578 B2* | 12/2019 | Zeng | H04L 5/001 |
| 10,547,429 B2* | 1/2020 | John Wilson | H04L 5/0094 |
| 10,548,153 B2* | 1/2020 | Akkarakaran | H04L 5/0053 |
| 10,567,058 B2* | 2/2020 | Guo | H04W 24/10 |
| 10,615,859 B2* | 4/2020 | Frenne | H04B 7/0617 |
| 10,674,544 B2 | 6/2020 | Stern-Berkowitz et al. | |
| 11,012,974 B2* | 5/2021 | Murray | H04W 52/0229 |
| 11,219,036 B2* | 1/2022 | Yi | H04L 5/0064 |
| 11,470,577 B2* | 10/2022 | Lee | H04W 68/025 |
| 11,825,444 B2* | 11/2023 | Lee | H04W 68/02 |
| 2013/0058240 A1 | 3/2013 | Kim et al. | |
| 2015/0131750 A1 | 5/2015 | Xue et al. | |
| 2015/0382205 A1 | 12/2015 | Lee et al. | |
| 2016/0190707 A1* | 6/2016 | Park | H01Q 3/24 370/329 |
| 2016/0278003 A1 | 9/2016 | Kim et al. | |
| 2017/0070991 A1* | 3/2017 | Subramanian | H04L 5/0023 |
| 2017/0094531 A1 | 3/2017 | Kakshima et al. | |
| 2017/0111886 A1* | 4/2017 | Kim | H04W 48/14 |
| 2017/0303247 A1 | 10/2017 | Yasukawa et al. | |
| 2017/0367069 A1 | 12/2017 | Agiwal et al. | |
| 2018/0176000 A1 | 6/2018 | Lee et al. | |
| 2018/0279135 A1 | 9/2018 | Hwang | H04W 72/23 |
| 2019/0044639 A1* | 2/2019 | Ouchi | H04W 72/23 |
| 2019/0110309 A1* | 4/2019 | Xu | H04L 5/0048 |
| 2019/0229789 A1* | 7/2019 | Zhang | H04B 7/0695 |
| 2019/0261287 A1* | 8/2019 | Deenoo | H04W 72/23 |
| 2019/0320355 A1* | 10/2019 | Da Silva | H04L 1/0026 |
| 2019/0350028 A1* | 11/2019 | Kaasalainen | H04B 7/0617 |
| 2020/0036430 A1* | 1/2020 | Kim | H04W 76/28 |
| 2020/0044721 A1* | 2/2020 | Choi | H04L 5/0053 |
| 2020/0059398 A1* | 2/2020 | Pan | H04W 72/21 |
| 2020/0084089 A1* | 3/2020 | Da Silva | H04W 24/08 |
| 2020/0092846 A1* | 3/2020 | Deng | H04W 68/025 |
| 2020/0145853 A1* | 5/2020 | Lou | H04W 24/08 |
| 2020/0404617 A1* | 12/2020 | Murray | H04W 68/02 |
| 2021/0258916 A1 | 8/2021 | He | |

FOREIGN PATENT DOCUMENTS

| | | |
|---|---|---|
| CN | 104956606 A | 9/2015 |
| CN | 105474556 A | 4/2016 |
| CN | 106105292 A | 11/2016 |
| CN | 106134121 A | 11/2016 |
| EP | 2563068 A2 | 2/2013 |
| JP | 2000137923 A | 5/2000 |
| RU | 2406263 C2 | 12/2010 |
| WO | WO 2016/047618 A1 | 3/2016 |
| WO | 2017052199 A1 | 3/2017 |
| WO | 2018144873 A1 | 8/2018 |

OTHER PUBLICATIONS

"Discussion on multi-beam based initial access for NR", Guangdong OPPO Mobile Telecom, R1-1611701, 3GPP TSG RAN WG1, Meeting #87, Reno, USA, Nov. 14-18, 2016, 3 pages
Third Generation Partnership Project, Technical Specification Group Radio Access Network; NR; Multiplexing and channel coding {Release 15), 3GPP TS 38.212 V15.1.1 (Apr. 2018).
ITL, "On NR PBCH Design," 3GPP TSG RAN WG1#88 bis, R1-1705793, Spokane, WA, USA { Apr. 3-7, 2017).
Mediatek Inc., "Design of Search Space," 3GPP TSG RAN WG1#88 bis, R1-1704444, Spokane, WA, USA (Apr. 3-7, 2017).
Nokia et al., "Paging in multi-beam system," 3GPP TSG RAN WG1#88 bis, R1-1705842, Spokane, WA, USA (Apr. 3-7, 2017).
Third Generation Partnership Project, Technical Specification Group Radio Access Network; Study on New Radio Access Technology Physical Layer Aspects {Release 14), 3GPP TR 38.912 V1.0.0 (Mar. 2017).
Third Generation Partnership Project, Technical Specification Group Radio Access Network; Study on New Radio Access Technology Physical Layer Aspects {Release 14), 3GPP TR 38.912 V14.0.0 (Mar. 2017).
Third Generation Partnership Project, Technical Specification Group Radio Access Network; Study on New Radio Access Technology Physical Layer Aspects {Release 14), 3GPP TR 38.912 V14.1.0 (Jun. 2017).
Huawei et al., "Multi-beam Paging for NR," 3GPP TSG RAN WG1 Meeting #88bis, R1-1704189, Spokane, USA Apr. 3-7, 2017).
NTT DOCOMO, INC., "Views on mechanism to recover from beam failure," 3GPP TSG RAN WG1 Meeting #88, R1-1702799, Athens, Greece {Feb. 13-17, 2017).
Huawei et al., "Paging mechanism for high frequency," 3GPP Tsg-Ran WG2#97bis, R2-1703458, Spokane, USA (Apr. 3-7, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

(56) References Cited

OTHER PUBLICATIONS

Interdigital, Inc., "Overhead reduction techniques for NR paging based on beam sweeping," 3GPP TSG RAN WG1 Meeting #91, R1-1720549, Reno, U.S.A (Nov. 27-Dec. 1, 2017).
Mediatek Inc., "Paging in NR with Beam Sweeping," 3GPP Tsg-Ran WG2 Meeting #97, R2-170xxxx (R2-1701331), Athens, Greece (Feb. 13-17, 2017).
Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).
Third Generation Partnership Project, "Technical Specification Group Radio Access Network; Evolved Universal Terrestrial Radio Access (E-UTRA); Physical channels and modulation (Release 14)," 3GPP TS 36.211 V14.2.0 (Mar. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.6.0 (Mar. 2018).
Third Generation Partnership Project, "Technical Specification Group Radio Access Network; Evolved Universal Terrestrial Radio Access (E-UTRA); Physical channels and modulation (Release 15)," 3GPP TS 36.211 V15.1.0 (Mar. 2018).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.6.0 (Sep. 2015).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.5.1 (Jan. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.1.0 (Mar. 2018).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.6.0 (Mar. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.1.0 (Mar. 2018).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.2.1 (Mar. 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.6.0 (Mar. 2018).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.1.0 (Mar. 2018).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.2.2 (Apr. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.6.2 (Apr. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.1.0 (Mar. 2018).
Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.2.0 (Mar. 2017).
Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.6.0 (Mar. 2018).
Third Generation Partnership Project, "Technical Specification Group Radio Access Network; NR; Physical layer procedures for control (Release 15)," 3GPP TS 38.213 V15.1.0 (Mar. 2018).
Third Generation Partnership Project, "Technical Specification Group Radio Access Network; NR; Radio Resource Control (RRC); Protocol specification (Release 15)," 3GPP TS 38.331 V0.0.2 (Mar. 2017).
Third Generation Partnership Project, "Technical Specification Group Radio Access Network; NR; Radio Resource Control (RRC) protocol specification (Release 15)," 3GPP TS 38.331 V15.1.0 (Mar. 2018).
Third Generation Partnership Project, "Technical Specification Group Radio Access Network; New Generation Radio Access Network; User Equipment (UE) procedures in Idle mode (Release 15)," 3GPP TS 38.304 v0.0.1 (Mar. 2017).
Third Generation Partnership Project, "Technical Specification Group Radio Access Network; NR; User Equipment (UE) procedures in Idle mode and RRC Inactive state (Release 15)," 3GPP TS 38.304 v1.0.1 (Apr. 2014).
R1-161862, "Remaining issues on paging transmission for NB-IoT", ZTE, 3GPP TSG RAN WG1 NB-IoT Ad-Hoc Meeting Sophia Antipolis, France, Mar. 22-24, 2016, 3 Pages.
R2-1701068, "Mobility Measurements in Idle and Inactive Mode", Nokia, 3GPP TSG-RAN WG2 Meeting #97, Feb. 2017, R2-1700168.
R1-1706013, "On NR paging design", Ericsson, 3GPP TSG-RAN WG1 Meeting #88-bis, Apr. 2017, R1-176013.
Third Generation Partnership Project (3GPP), "On Unified SS Block Composition", MediaTek Inc., 3GPP TSG RAN WG1 Meeting #88b, Spokane, Washington, USA, Apr. 3-7, 2017, R1-1704453, 4 pages.
Third Generation Partnership Project (3GPP), "Discussion on paging design for NR", NTT DOCOMO, INC., 3GPP TSG RAN WG1 Meeting #88bis, Spokane, USA, Apr. 3-7, 2017, R1-1705710, 5 pages.

* cited by examiner

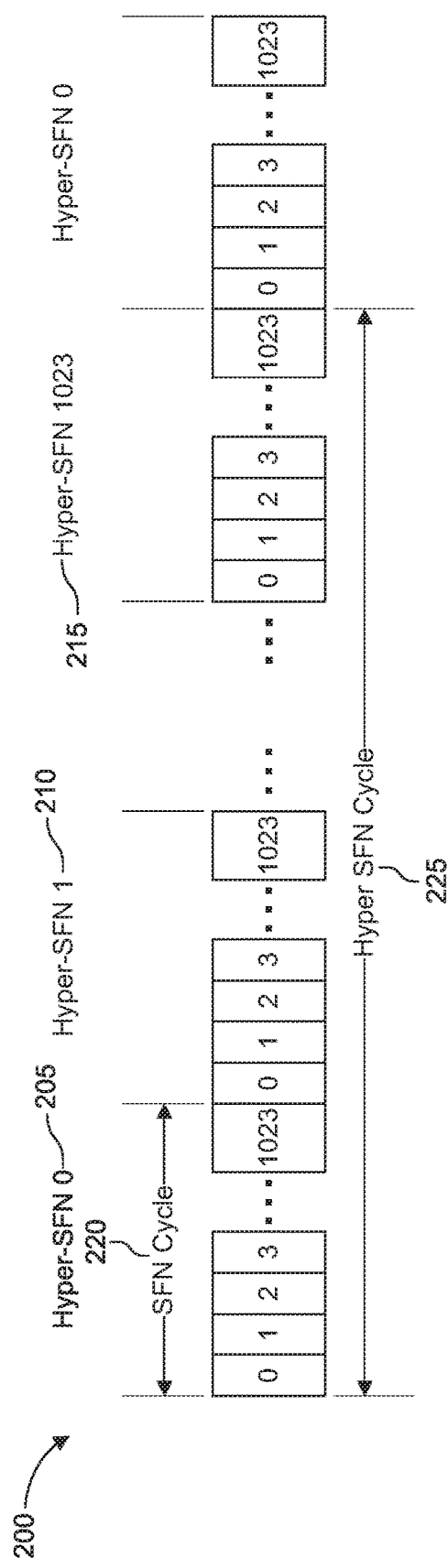
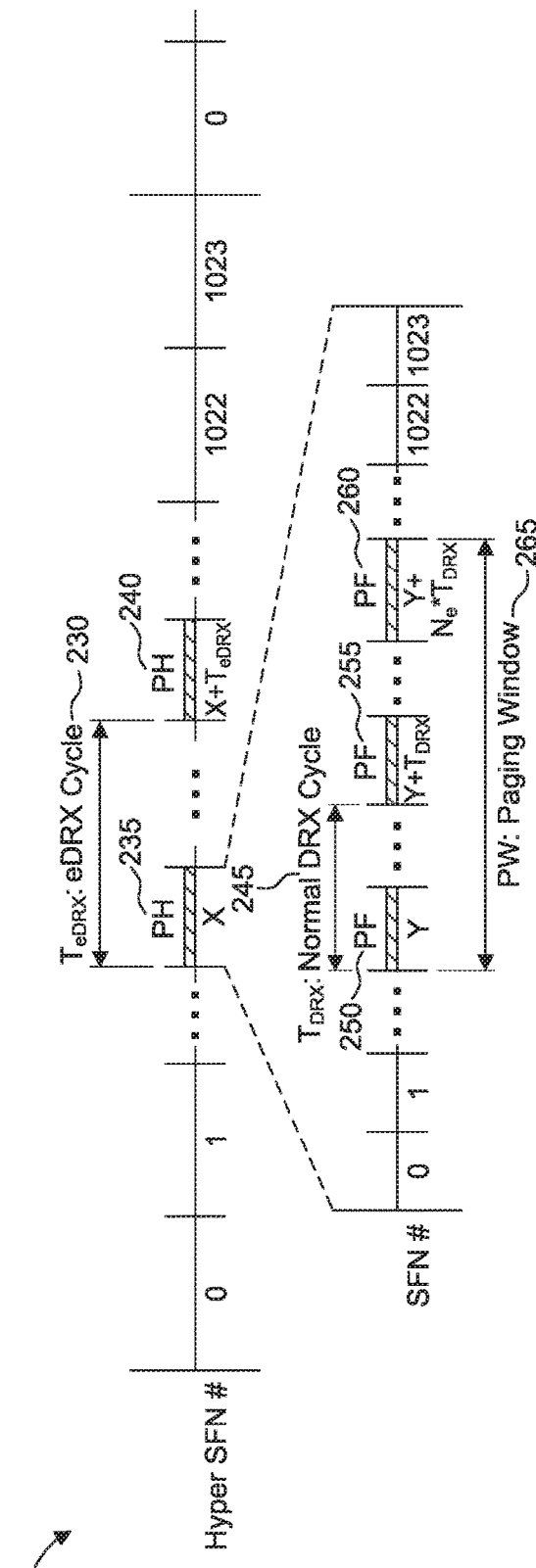
FIG. 2A
FIG. 2B

METHOD AND APPARATUS FOR PAGING PROCEDURES IN NEW RADIO (NR)

CROSS REFERENCE TO RELATED APPLICATIONS

This application is a continuation of U.S. patent application Ser. No. 17/892,289, filed Aug. 22, 2022, which is a continuation of U.S. patent application Ser. No. 17/087,312, filed Nov. 2, 2020, which issued on Oct. 11, 2022 as U.S. Pat. No. 11,470,577, which is a continuation of U.S. patent application Ser. No. 16/609,928, filed on Oct. 31, 2019, which issued on Nov. 3, 2020 as U.S. Pat. No. 10,827,459, which is the U.S. National Stage, under 35 U.S.C. § 371, of International Application No. PCT/US2018/030968 filed May 3, 2018, which claims the benefit of U.S. Provisional Application No. 62/519,699, filed Jun. 14, 2017, and U.S. Provisional Application No. 62/500,706, filed May 3, 2017, the entire contents of which are hereby incorporated by reference herein.

BACKGROUND

In 5G New Radio (NR), to fulfill the high data rate requirements, above 6 GHz frequency spectrum have been agreed to use in order to leverage the large bandwidth. One of challenges in using these above 6 GHz frequencies may be significant propagation loss, especially in an outdoor environment due to higher free space path loss in a higher frequency. In NR, a beam-centric system has been adopted to address the significant path loss in a higher frequency since it can compensate path loss without increasing transmission power. For example, multiple beams may be used for initial access and subsequent paging procedures. However, existing paging channels has not been designed based on the beam-centric system. Moreover, different paging channel resources cannot be transmitted with more than one beam in the existing paging channels. Thus, it would be desirable to have methods and apparatuses that support multiplexing of paging messages for multiple wireless transmit/receive units (WTRUs) in a beam-centric system.

SUMMARY

Methods and apparatuses are described herein for paging procedures in wireless systems. For example, a wireless transmit receive unit (WTRU) may receive, from a base station (BS), a configuration of beam tracking areas (BTAs) that associates a set of synchronization signal (SS) blocks with each BTA. The WTRU may select, based on at least one measurement of at least one beam associated with the set of SS blocks, a first SS block in a first subset of SS blocks. The WTRU may determine, based on the configuration of BTAs, the first BTA associated with the first subset of SS blocks. The WTRU may then monitor one or more physical downlink control channels (PDCCHs) for paging resources associated with the first subset of SS blocks that corresponds to the first BTA. On a condition that at least one measurement of at least one beam associated with the first subset of SS blocks is less than a predetermined threshold, the WTRU may transmit, to a base station (BS), a signal indicating a second BTA that is associated with a second subset of SS blocks. The signal may include a physical random access channel (PRACH) resource associated with the second subset of SS blocks that corresponds to the second BTA. The set of SS blocks may comprise the first subset of SS blocks and the second subset of SS blocks. An SS block in the set of SS blocks may comprise a primary synchronization signal (PSS), a secondary synchronization signal (SSS), and a physical broadcasting channel (PBCH) associated with the SS block.

BRIEF DESCRIPTION OF THE DRAWINGS

A more detailed understanding may be had from the following description, given by way of example in conjunction with the accompanying drawings wherein:

FIG. 2A is a diagram illustrating an example of timing for hyper frames (HFs);

FIG. 2B is a diagram illustrating an example of paging within hyper frames;

DETAILED DESCRIPTION

Figure 1A:
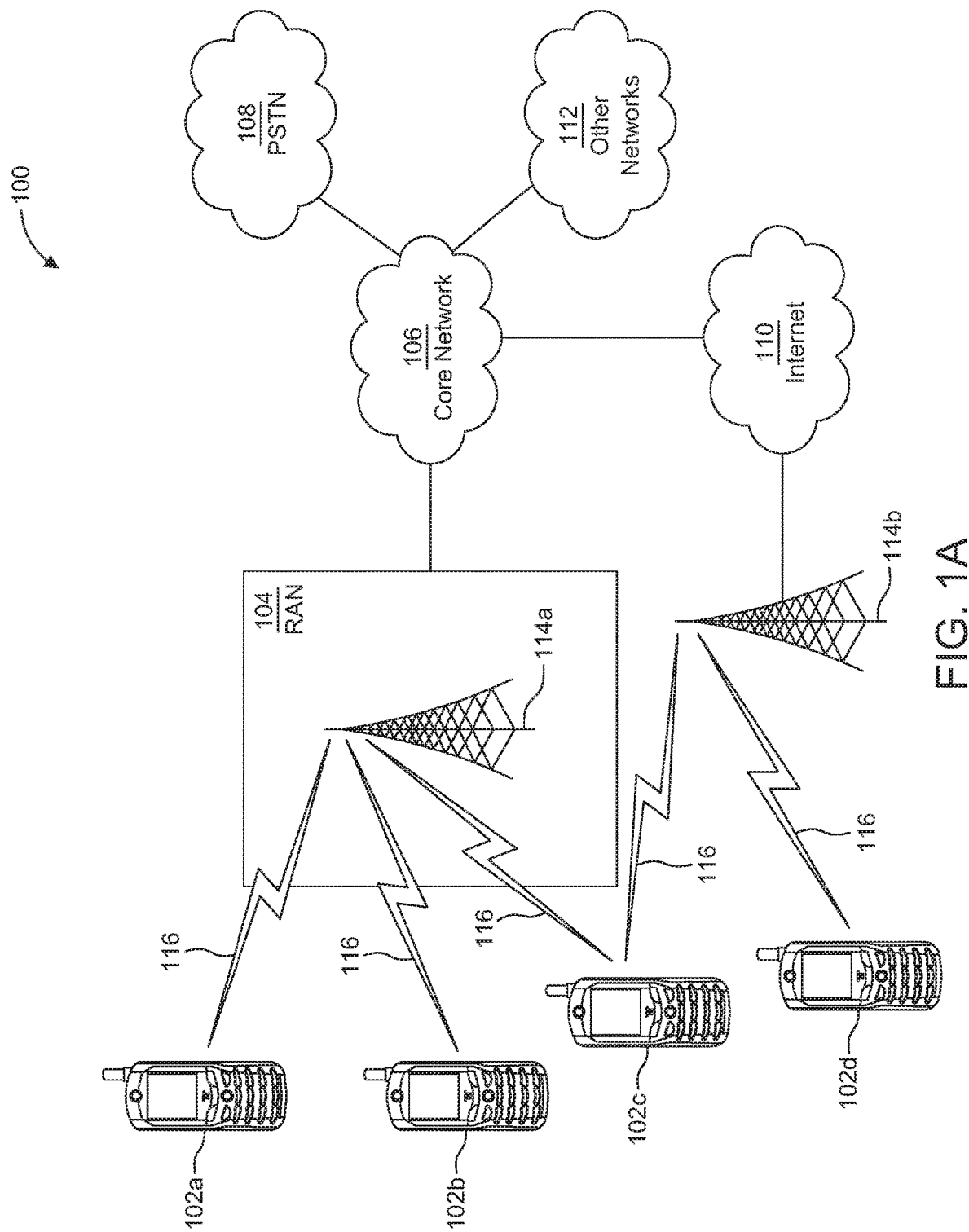
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
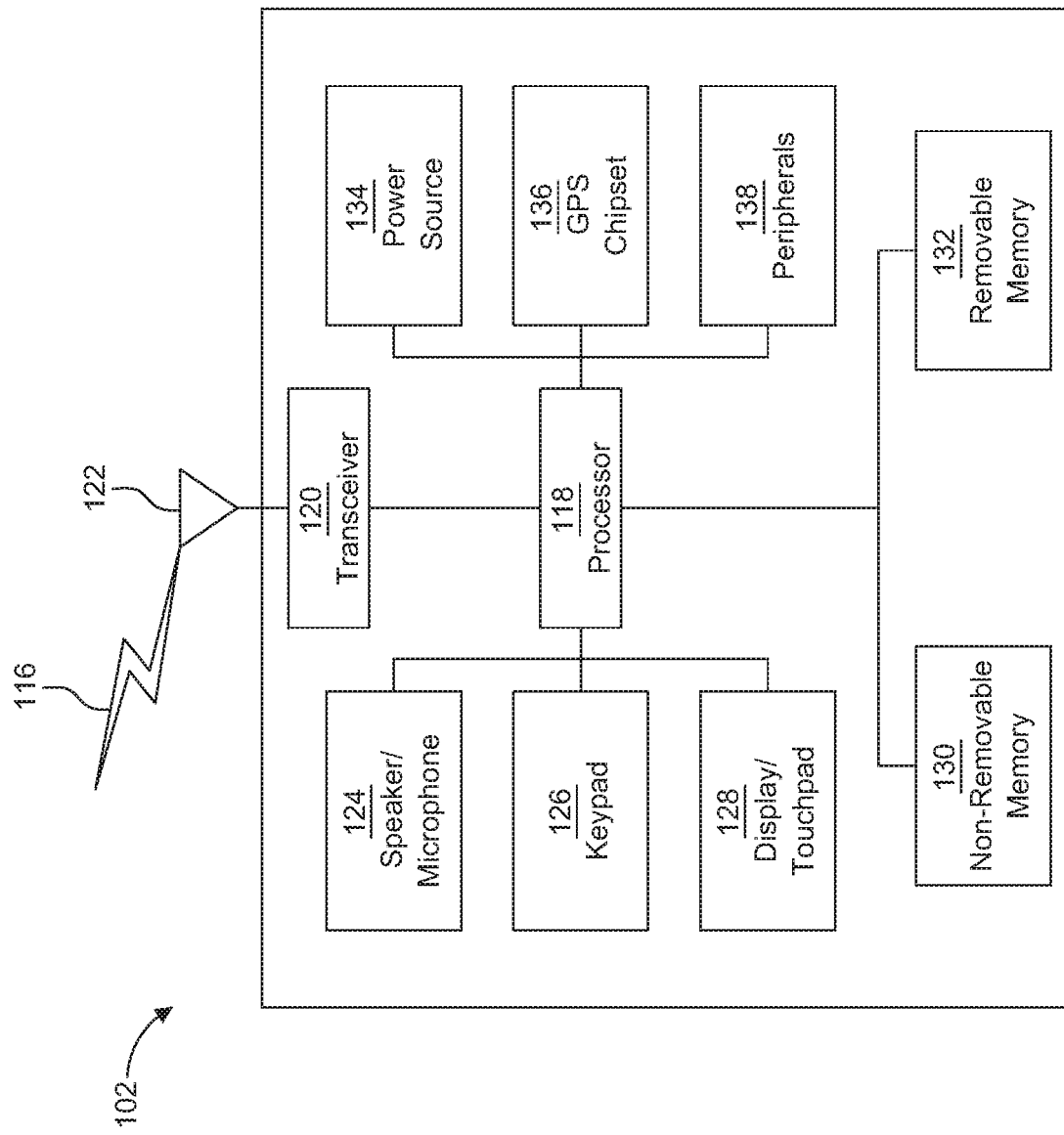
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
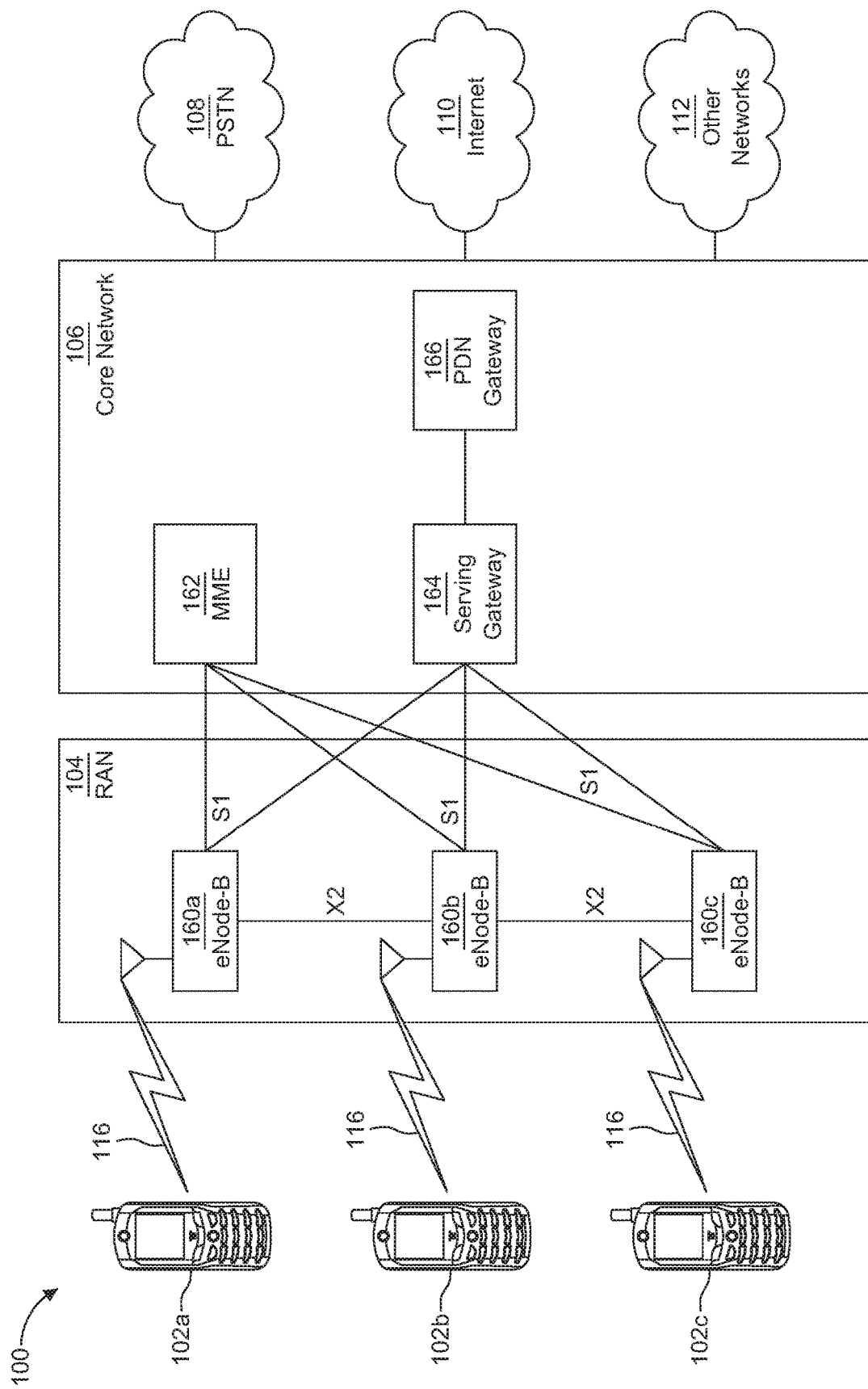
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
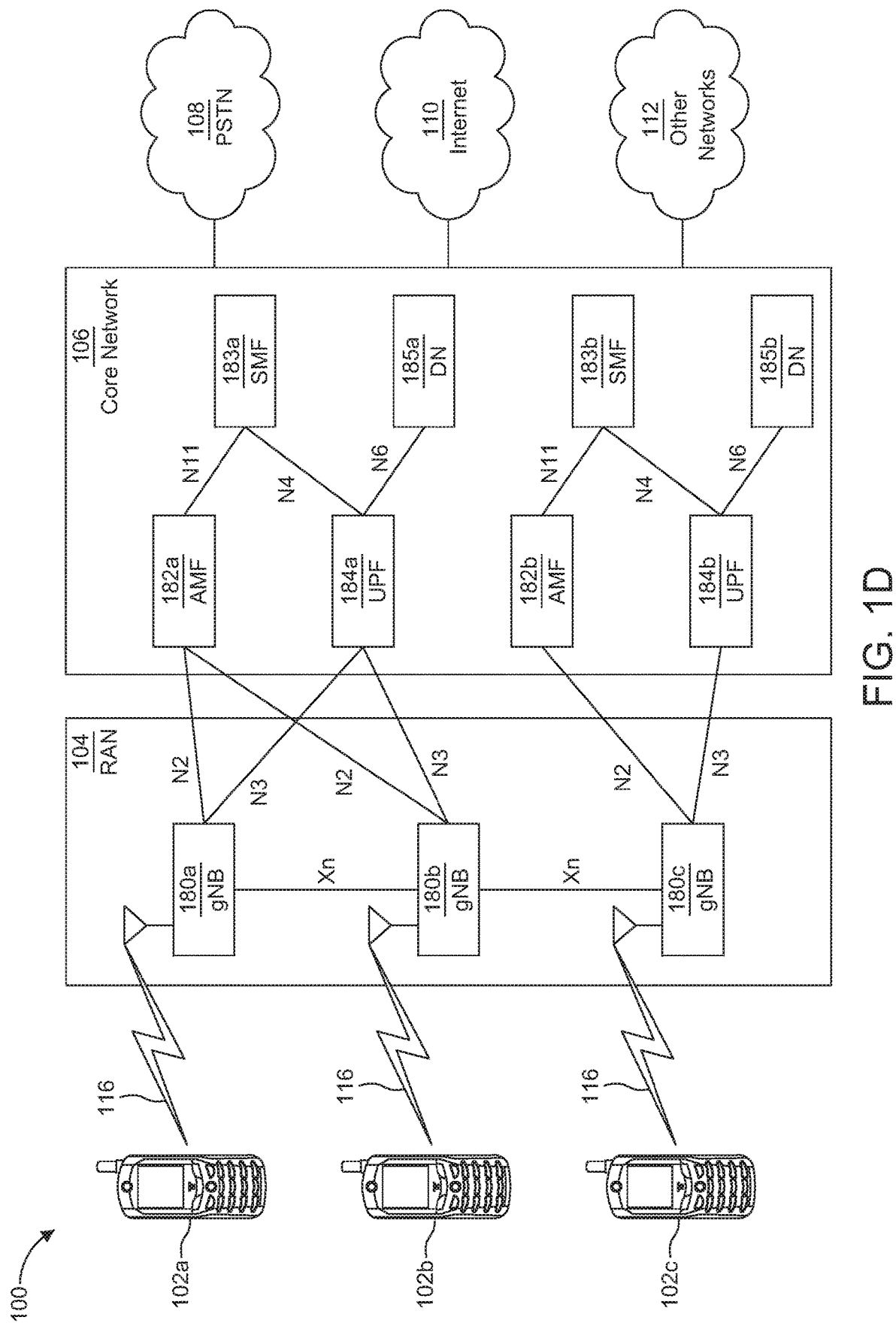
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In 5G New Radio (NR), to fulfill the high data rate requirements, above 6 GHz frequency spectrum have been agreed to use in order to leverage the large bandwidth. One of challenges in using these above 6 GHz frequencies may be significant propagation loss, especially in an outdoor environment due to higher free space path loss in a higher frequency. A beamforming (e.g., analog beam) has been adopted to address the significant path loss in a higher frequency since it can compensate path loss without increasing transmission power. As beams are used to compensate the path loss, all downlink and uplink channels needs to be based on beams. Thus, 5G NR downlink physical channels and downlink control channels need to be defined for the beam-based systems where the beams are used for paging channels.

For paging, a WTRU may periodically monitor a physical downlink control channel (PDCCH) for a downlink control information (DCI) or downlink (DL) assignment on a PDCCH masked with a paging RNTI (P-RNTI), for example, in idle mode and/or in connected mode. When a WTRU detects or receives a DCI or DL assignment using a P-RNTI, the WTRU may demodulate the associated or indicated physical downlink shared channel (PDSCH) resource blocks (RBs) and/or may decode a paging channel (PCH) that may be carried on an associated or indicated PDSCH. A PDSCH carrying PCH may be referred to as a PCH PDSCH. As used herein, the terms paging, paging message, or PCH and variations thereof may be used interchangeably throughout this disclosure.

For example, to receive paging message from the network, WTRUs in idle mode may monitor the PDCCH channel for an RNTI value used to indicate paging (i.e. P-RNTI). The WTRU may need to monitor the PDCCH channel at certain WTRU-specific occasions (i.e. at specific subframes within specific radio frames). At other times, the WTRU may apply discontinuous reception (DRX), meaning that it can switch off its receiver to preserve battery power. The network may configure which of the radio frames and subframes are used for paging. Each cell may broadcast a default paging cycle or a WTRU-specific paging cycle. The WTRU may calculate the radio frame (i.e. paging frame) and the subframe within that paging frame (i.e. paging occasion).

The paging frame (PF) and subframe within that PF (i.e. paging occasion) may be determined based on the WTRU ID (e.g., UE_ID) and parameters which may be specified by the network. The parameters may include, but are not limited to, the paging cycle (PC) length (e.g., in frames), and the number of paging subframes per paging cycle (e.g., nB). The PC length may be the same as a DRX cycle. The number of paging subframes per paging cycle (e.g., nB) may enable the determination of the number of PF per PC (e.g., N) and the number of PO per PF (e.g., Ns) which may be in the cell. The WTRU ID, in an embodiment, may be the WTRU IMSI mod 1024. The subframe within the PF may be the paging occasion (PO) that a WTRU may monitor for the paging channel, for example, in idle mode.

From the network perspective, there may be multiple PFs per paging cycle and multiple POs within a PF. For example, more than one subframe per paging cycle may carry PDCCH masked with a P-RNTI. Additionally, from the WTRU perspective, a WTRU may monitor a PO per paging cycle, and such a PO may be determined based on the parameters specified herein (e.g., above). The parameters may be provided to the WTRU via system information, dedicated signaling information, or the like. POs may include pages for one or more specific WTRUs, or they may include system information change pages which may be directed to each of the WTRUs. In idle mode, a WTRU may receive pages for reasons such as an incoming call or system information update changes.

In connected mode, a WTRU may receive pages related to system information change, for example. The WTRU may not receive WTRU-specific pages that may be used for an incoming call. As such, a WTRU in the connected mode may not monitor a specific PO. Additionally, for frequency division duplex (FDD), the PO subframes may be limited to certain subframes such as subframes 0, 4, 5 and 9. For time division duplex (TDD), the PO subframes may be limited to certain subframes such as subframes 0, 1, 5 and 6.

Discontinuous reception (DRX) is described herein. In idle mode (e.g., RRC idle mode and/or EPS connection management (ECM) idle mode), a WTRU may monitor for or listen to the paging message for incoming calls, system information change, Earthquake and Tsunami Warning Service (ETWS) notification for ETWS capable WTRUs, Commercial Mobile Alert System (CMAS) notification. Extended Access Barring parameters modification, or the like.

A WTRU may monitor PDCCH for P-RNTI discontinuously, for example, to reduce battery consumption when there may be no pages for the WTRU. DRX may be or include the process of monitoring PDCCH discontinuously. In idle mode, DRX may be or include the process of monitoring PDCCH discontinuously for P-RNTI, for example to monitor for or listen to a paging message during RRC idle state.

As used herein, the terms idle mode, idle state, RRC idle mode, RRC idle state, or RRC_IDLE mode/state may be used interchangeably throughout this disclosure. The terms RRC Idle and ECM Idle may also be used interchangeably throughout this disclosure. DRX can also be enabled and/or used in Connected Mode. When in Connected Mode, if DRX is configured, the MAC entity may monitor the PDCCH discontinuously, for example using DRX operation. Connected Mode, Connected State, and RRC_CONNECTED mode or state may be used interchangeably. As used herein, the terms paging, paging message, or PCH and variations thereof may be used interchangeably throughout this disclosure.

Idle mode DRX is described herein. A WTRU may use one or more DRX parameters that may be broadcasted, for example, in a system information block (SIB) such as SIB2, to determine the PF and/or PO to monitor for paging. Alternatively or additionally, the WTRU may use one or more WTRU specific DRX cycle parameters that may be signaled to the WTRU, for example by the MME through NAS signaling.

Table 1 provides examples of DRX parameters including example ranges and the example source of the parameter (e.g., eNB or MME).

TABLE 1

Example DRX Cycle Parameters.

| DRX parameter | Notation | Value Range | Configuring Network Node |
|---|---|---|---|
| WTRU Specific DRX cycle | TUE | 32, 4, 128 and 256 radio frames where each radio frame may be 10 ms | MME, e.g., via NAS signaling |
| Cell specific DRX cycle | TCELL | 32, 4, 128 and 256 radio frames | eNB, e.g., via system information such as SIB2 |
| Number of POs per DRX cycle, e.g., DRX cycle across all users in the cell | nB | 4T, 2T, T, T/2, T/4, T/8, T/16, T/32 where T may be the DRX cycle of the WTRU, for example, TCELL or the smaller of TUE, if provided, and TCELL | eNB, e.g., via system information such as SIB2 |

The DRX cycle T of the WTRU may indicate the number of radio frames in the paging cycle. A larger value of T may result in less WTRU battery power consumption. A smaller value of T may increase WTRU battery power consumption. DRX cycle may be cell specific or WTRU specific.

A DRX cycle that is provided by the base station (BS) (e.g., eNB) may be cell specific and may be provided to at least some (e.g., all) WTRUs in a cell. The DRX cycle that may be provided by the BS (e.g., eNB) may be the default paging cycle. A DRX cycle provided by the MME may be a WTRU specific. The WTRU may use the smaller among the default paging cycle and the WTRU specific DRX cycle as its DRX or paging cycle. An MME may provide a WTRU specific DRX cycle to a WTRU in NAS signaling, for example as 'a WTRU specific DRX cycle.' An MME may provide a WTRU specific DRX cycle to a BS (e.g., eNB) in a PAGING S1 AP message as 'Paging DRX', for example, for an MME initiated paging message that may be intended for the WTRU.

The WTRU and/or BS (e.g., eNB) may use the minimum between the default and specific DRX cycle. For example, $T=\text{Min}(T_{UE}, -T_{CELL})$ in radio frames. A WTRU with DRX cycle of N (e.g., 128) radio frames may need to wake up every N×frame time (e.g., 1.28 second for frame time of 10 ms) and look for a paging message.

The parameter nB (i.e. the number of paging subframe per paging cycle) may indicate the number of paging occasions in a cell specific DRX cycle. The parameter may be cell specific. Configuration of the nB value may depend on the paging capacity that may be desired or used in a cell. A larger value of nB may be used, for example, to increase paging capacity. A smaller value of nB may be used, for example, for a smaller paging capacity.

The BS (e.g., eNB) and/or WTRU may calculate the WTRU's PFs according to the following Equation (1):

$$PF = SFN \bmod T = (T \text{ div } N)^*(WTRU\_ID \bmod N) \quad \text{Equation (1)}$$

where N is determined as N=min (T, nB). The WTRU specific PO within the PF may be determined from a set of paging subframes. The set may be a function of predefined allowed subframes for paging and/or the number of POs per PF which may be a function of at least nB and/or T. System Frame Number (SFN) may have a range of values such as 0 through 1023.

Connected mode DRX is described herein. In connected mode, a PF and PO may be determined in a similar manner as in idle mode. The DRX cycle parameters may be different for idle and connected modes. A WTRU may monitor a (e.g., any) PO in a PC in connected mode, for example, to obtain system information change information.

It may be desirable to have longer DRX cycles such as extended DRX (eDRX) for devices such as machine type communication (MTC) devices. In addition, longer DRX cycles may be useful for some devices such as delay tolerant devices For example, it may reduce battery consumption and/or increase battery life for those devices.

FIG. 2A illustrates an example 200 of timing for hyper frames (HFs) 205, 210, 215, which may be used in any combination of other embodiments described herein. As illustrated in FIG. 2A, a time unit (e.g., hyper frames (HFs) 205, 210, 215) may be used with, as an extension of or on top of radio frames and/or system frame number (SFN) timing (e.g., legacy SFN timing). One HF 205, 210, 215 may include an SFN cycle 220, for example, 1024 radio frames or 10.24 s. A HF 205, 210, 215 may have a hyper-system frame number (H-SFN). An H-SFN cycle 225 may include 1024 SFN cycles 220. An H-SFN cycle 225 may last 1024*102410 ms (i.e. 174.76 minutes).

An idle mode extended DRX (I-eDRX) cycle may include up to 256 H-SFN cycles 225. For example, an I-eDRX may last 256*1024*10 ms (i.e. 43.69 minutes). The H-SFN cycle 225 may be broadcast by the cell. The H-SFN cycle 225 may increment at SFN cycle boundaries.

FIG. 2B illustrates an example 201 of paging within HFs 205, 210, 215, which may be used in any combination of other embodiments described herein. The H-SFN in which a WTRU may become reachable for paging may be referred to as a Paging hyper frame (PH) 235, 240 or as the WTRU's PH 235, 240. A PH 235, 240 may be applicable (or only applicable) in ECM idle. A PH 235, 240 may be computed as a function of the extended DRX cycle and/or WTRU ID (e.g., IMSI mod (1024)). Within a PH 235, 240, the determination of the PF 250, 255, 260 and/or PO may follow the regular DRX rules and/or formulas. For example, a WTRU may receive a PF 250, 255, 260 based on normal DRX cycle 245. A WTRU's paging window (PW) 265 may be the window or time span corresponding to the set of PFs 250, 255, 260 in the WTRU's PH 235, 240 during which the WTRU may monitor for paging and/or may be paged. The PW 265 may include a subset of the available PFs 250, 255, 260 in the PH 235, 240. The PW 265 may be signaled to the WTRU, for example, by the MME in a NAS message. In a PF 250, 255, 260, a WTRU may monitor (or only monitor) one PO. Paging to a WTRU may be repeated in one or more of a WTRU's PFs 250, 255, 260 in its PW 265, for example, if the WTRU does not respond to a previous page.

A cell's support for the idle mode extended DRX (I-eDRX) may be implicitly indicated by the broadcast of H-SFN. For long DRX cycles, it may be useful for the MME to have some awareness of when the WTRU becomes reachable, for example, to avoid storing paging requests at the BS (e.g., eNB) for a long time. In connected mode, the DRX cycle may be extended up to the SFN limit, for example, by extending the range of values for long DRX cycle to 10.24 seconds.

Figure 3:
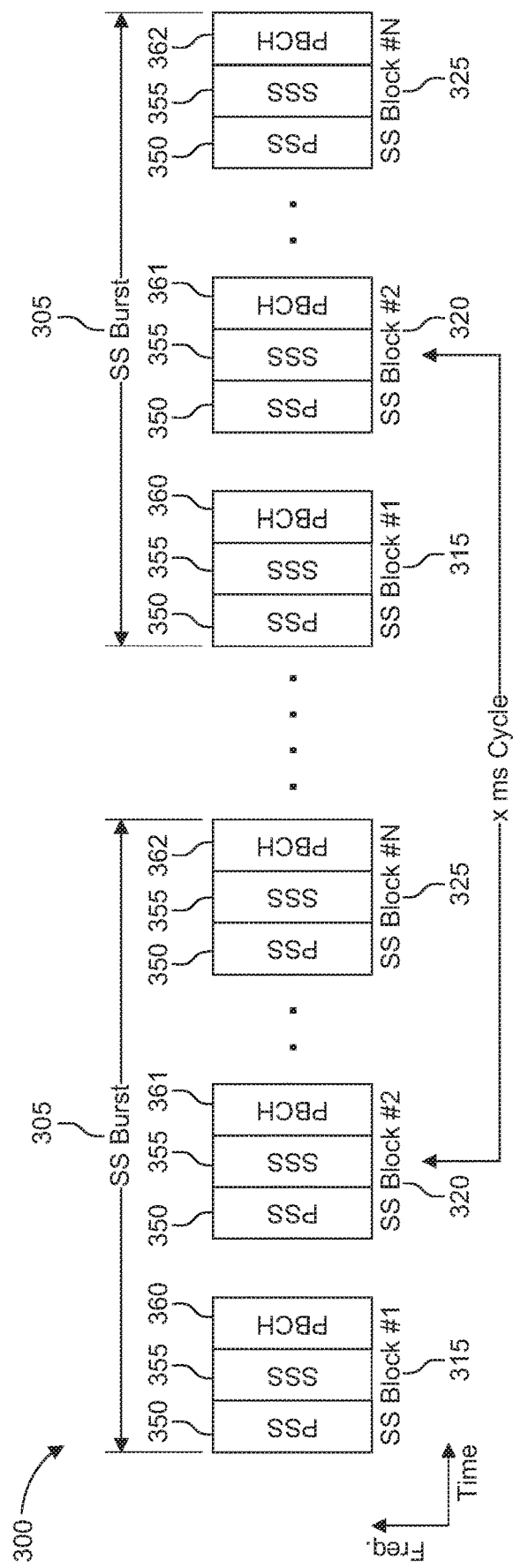
FIG. 3 is a diagram illustrating an example of synchronization signal (SS) blocks within SS bursts.

FIG. 3 illustrates an example 300 of synchronization signal (SS) blocks 315, 320, 325 within SS bursts 305, which may be used in any combination of other embodiments described herein. A synchronization signal burst (SS burst) 305 may be used when multiple beams are used for initial access. For example, the SS burst 305 may be transmitted periodically (e.g., every 20 ms) and each SS burst 305 may include one or more SS block 315, 320, 325. As illustrated in FIG. 3, one or more SS blocks (i.e. SS block #1 315, SS block #2 320, and SS block #3 325) may be transmitted periodically with x ms cycle. In addition, each of the SS blocks 315, 320, 325 may be associated with a beam. For example, if 64 beams are used by a base station (BS), there may be 64 SS blocks where each beam includes an SS block 315, 320, 325 in its respective transmission. In another example, 64 SS blocks may be assigned to one beam.

As illustrated in FIG. 3, an SS block 315, 320, 325 may include a primary synchronization signal (PSS) 350, secondary synchronization signal (SSS) 355, and physical broadcast channel (PBCH) 360, 361, 362. After detecting the synchronization signals (i.e. PSS 350 and SSS 355), a WTRU may decode the PBCH 360, 361, 362, from which master information block (MIB) is obtained. The MIB may include a number of the most frequently transmitted parameters essential for initial access to the cell. In addition to MIB, the PBCH 360, 361, 362 may carry essential information for an SS block 315, 320, 325 such as SS block specific configuration. The SS block specific configuration may include, but are not limited to, an SS block number, a beam tracking area number associated with the SS block

315, 320, 325, and subsequent control channel configuration (e.g., PDCCH and PDSCH). Based on the SS block specific configuration, the WTRU may further receive broadcasting signals associated with each SS block 315, 320, 325. For example, the WTRU may receive, via PDSCH, system information blocks (SIBs) associated with each SS block 315, 320, 325.

As described above, one or more SS blocks 315, 320, 325 in a SS burst 305 may be associated with one or more beams. The number of SS blocks 315, 320, 325 in a SS burst 305 may be determined by a BS (e.g., gNB) based on the number of beams used at the BS. In an example, if NB beams are used at a BS (e.g., gNB), NB SS blocks 315, 320, 325 may be used or transmitted in a SS burst 305. In a single SS burst 305, each SS block 315, 320, 325 may include same or similar synchronization information for the PSS 350 and SSS 355. However, each SS block 315, 320, 325 may include different configuration information (e.g., different SS block number) for each PBCH 360, 361, 362 that is specific to the SS block 315, 320, 325 associated with its respective beam.

As described above, in order to monitor paging messages, a downlink control channel (e.g., PDCCH or NR-PDCCH) needs to be configured or defined for a WTRU in a beam-based system, wherein beams are used for paging channels. In one embodiment, a WTRU may monitor a PDCCH or NR-PDCCH for paging message, wherein the PDCCH or NR-PDCCH resource and/or search spaces may be configured, determined, or used in a beam-specific manner or a beam common manner.

A beam-specific paging occasion (PO) for the PDCCH or NR-PDCCH in a beam-specific system is described herein. A paging slot may be defined, used, or configured as a slot which may be potentially used for paging channel in NR. The paging slot may be configured with one or more parameters including at least one of paging cycle, cell-ID, numerology (e.g., subcarrier spacing), slot length (e.g., regular slot or mini-slot), and frequency band (e.g., below 6 GHz or above 6 GHz). As used herein, the term paging slot may be interchangeably used with paging frame, cell-specific paging slot, and paging resources throughout this disclosure. The paging slot may include downlink control channel(s), such as PDCCH or NR-PDCCH, for paging monitoring and downlink shared channel(s), such as PDSCH or NR-PDSCH, associated with the paging slot. Specifically, a WTRU may monitor downlink control channels configured for paging monitoring. When the WTRU receives DCI in the downlink control channel, the DCI may include paging information or scheduling information of PDSCH that may carry a paging message. Alternatively, the paging slot may include PDCCH or NR-PDCCH for paging monitoring only. As used herein, the term PDCCH may be interchangeably used with NR-PDCCH, Control Resource Set (CORESET), search space, search space for paging, common search space, and common search space for paging throughout this disclosure. The term PDSCH may be interchangeably used with NR-PDSCH throughout this disclosure.

A paging block may be defined, used, or configured as a frequency resource which may be potentially used for paging channel in NR. The paging block may be one or more frequency resource blocks which may be used for PDCCH or NR-PDCCH associated with paging channel. One or more paging blocks may be located in a paging slot and configured with one or more parameters including at least one of cell-ID, numerology (e.g., subcarrier spacing), frequency band (e.g., below 6 GHz or above 6 GHz), system bandwidth, the number of paging blocks or the like. As used herein, the term paging block may be interchangeably used with paging frequency resource, paging subband, paging narrowband, and paging physical resource block throughout this disclosure.

A paging resource may be defined, used, or configured with a time (e.g., a paging slot) and frequency (e.g., a paging block) resources. The paging resource may be referred to as a PDCCH associated with an SS block or more particularly, a common search space where a WTRU monitors a paging DCI with a P-RNTI.

A paging occasion (PO) may be defined, used, or configured as a paging resource in which a WTRU may monitor, attempt to decode, or receive a DCI associated with paging channel in a PDCCH or NR-PDCCH. The paging occasion may be considered as a paging resource configured or used for a WTRU or a group of WTRUs for the paging channel reception. The paging occasions for a WTRU or a group of WTRUs may be a subset of paging resources. The subset of paging resources may be determined, configured, or used based on at least one of WTRU-specific parameters, cell-specific parameters, numerology, frequency band, or the like. Examples of the WTRU-specific parameters may include, but are not limited to, a WTRU-ID, DRX cycle, beam index, BPL index, and determined SS block such as SS block index and SS block time location during initial access. Examples of the cell-specific parameters may include, but are not limited to, paging resource configurations, paging slot cycle, and the like. Examples of numerology may include, but are not limited to, subcarrier spacing, cyclic prefix length, and the like. The frequency band may be below 6 GHz or above 6 GHz. In addition, one or more paging occasions (POs) may be configured or determined for a WTRU or a group of WTRUs, wherein the WTRU or the group of WTRUs may monitor a subset of POs.

In one embodiment, a paging slot may be configured or determined in a beam-specific manner by association between beams and POs. For example, a paging slot may be associated with a same beam for an SS block. One or more SS blocks may be used in an SS burst and each SS block may be associated with a beam or a beam pair link (BPL). Each SS block may also be associated with a paging slot which may be dedicated to the SS block. Specifically, a paging slot length may be aligned with SS block length. For example, if $N_{sym}$ OFDM symbols are used for an SS block, the paging slot length may be $N_{sym}$ OFDM symbols.

The paging slot associated with an SS block may be located in the same OFDM symbols used for the associated SS block. Specifically, at least for PDCCH or NR-PDCCH, the paging slot may be located in the same OFDM symbols that may be used for the SS block. A subset of SS blocks or SS bursts may be used for the paging slot associated with an SS block. For example, if an SS block is transmitted every 20 ms, the paging slot associated with the SS block may be configured as every 20×k ms, wherein k may a positive integer number. The k value may be configured by a BS (e.g., gNB). For example, k value may be indicated in a broadcasting channel or may be determined based on the number of SS blocks in an SS burst. The k value may be scaled based on the number of SS blocks in an SS burst, where the number of SS blocks in an SS burst may be indicated in a broadcasting signal.

The subset of SS blocks for the paging slot may be determined from at least one of cell-specific parameters, frequency band, number of OFDM symbols, and the like. Specifically, the cell-specific parameters may include at least one of a cell-specific paging cycle, system bandwidth, the number of paging blocks, cell-ID, and the like. The frequency band may be below 6 GHz and/or above 6 GHz. The number of OFDM symbols may be used for an SS block or PBCH in an SS block.

A WTRU may assume that the paging resource associated with an SS block may be quasi-co-located (QCL-ed) with the SS block (e.g., PSS, SSS, and/or DM-RS of PBCH in the SS block). Examples of the paging resource associated with the SS block may include, but are not limited to, demodulation-reference signal (DM-RS) of PDCCH or NR-PDCCH which may be monitored by a WTRU for paging, or DM-RS of PDSCH or NR-PDSCH carrying paging message. Specifically, TX and/or RX beam related information may be QCL-ed between the SS block and its associated paging resource. Moreover, all QCL parameters (e.g., timing, Doppler spread, delay spread, beam, frequency, or the like) may be assumed to be QCL-ed for the SS block and its associated paging resource.

The paging slot associated with an SS block may be indicated based on a time, frequency, and/or an offset from the SS block. PBCH in the SS block may include the paging slot location related information in MIB or minimum system information (MSI). For example, MIB may contain a bit field which may carry the paging slot related information. MSI may include the paging slot location related information The MSI may be scheduled via a common PDCCH or NR-PDCCH which may be configured by MIB. The MSI may be beam-specific. Thus, MSI may be scheduled by its associated SS block. The common PDCCH or NR-PDCCH for MSI (or remaining minimum SI (RMSI)) may be used for paging channel as well. A WTRU may monitor the common PDCCH or NR-PDCCH for MSI (or RMSI) and paging, where the DCI for MSI (or RMSI) and the DCI for paging may be identified by an RNTI. For example, a MSI-RNTI may be used to scramble CRC of the DCI used for MSI (or RMSI), and a P-RNTI may be used to scramble CRC of the DCI used for paging channel. The DCI size for MSI and paging channel may be the same.

A time slot for common NR-PDCCH may be defined, configured, or used based on the SS block. For example, a time slot for a common NR-PDCCH may have the same number of OFDM symbols used for an SS block. A common NR-PDCCH may be associated with an SS block and the time slot for the common NR-PDCCH associated with an SS block may be located in the same OFDM symbols used for the SS block. A time slot for common NR-PDCCH may be interchangeably used with a paging slot if the common NR-PDCCH may be used for paging channel. The time slot for common NR-PDCCH may be interchangeably used with a common NR-PDCCH time slot, a slot for common NR-PDCCH, a common time slot, a beam-specific time slot, and a beam-specific common NR-PDCCH time slot.

Figure 4:
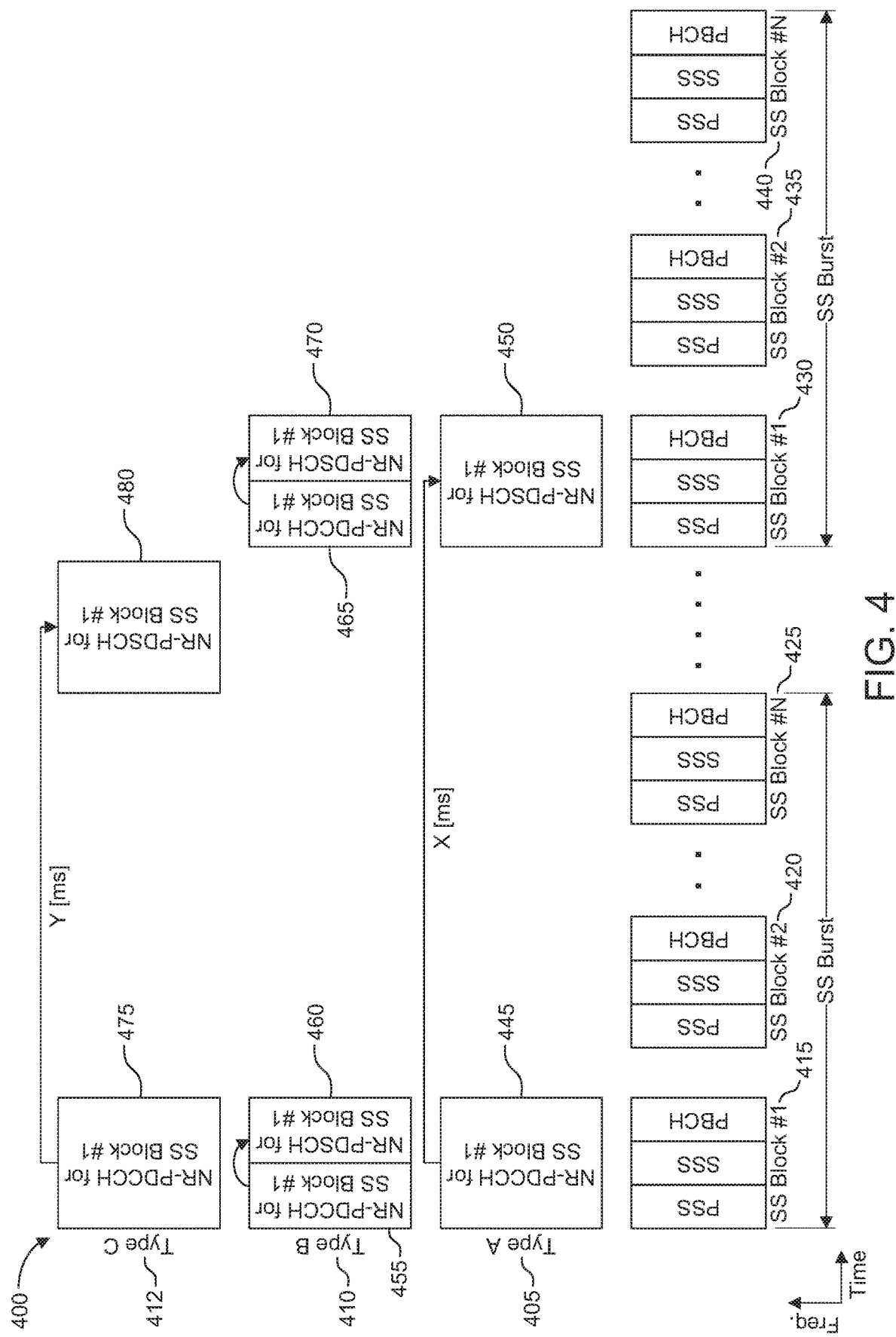
FIG. 4 is a diagram illustrating an example of association types for new radio-physical downlink control channel (NR-PDCCH) and new-radio-physical downlink control channel (NR-PDSCH)

FIG. 4 illustrates an example 400 of association types 405, 410, 412 for new radio-physical downlink control channel (NR-PDCCH) and new-radio-physical downlink control channel (NR-PDSCH), which may be used in any combination of other embodiments described herein. As illustrated in FIG. 4, one or more association types 405, 410, 412 may be used for NR-PDCCH and/or NR-PDSCH for broadcasting and paging channel. For example, a first type (e.g., type-A 405) may use time slots for NR-PDCCH 445 and NR-PDSCH 450 transmission. In the type-A association 405, the NR-PDCCH 445 that is associated with the SS block #1 415 may be first transmitted in a time slot. In the next time slot or later time slot, the NR-PDSCH 450 that is associated with the NR-PDCCH 445 (or the SS block #1 430) may be transmitted with x ms period. A second type (i.e. type-B 410) may use a time slot for both NR-PDCCH 455 and its associated NR-PDSCH 460 transmission. In the type-B association 410, the NR-PDCCH 455 and NR-PDSCH 460 associated with the SS block #1 415 may be transmitted together in a time slot. In the next time slot or later time slot, the NR-PDCCH 465 and NR-PDSCH 470 associated with the SS block #1 430 may be transmitted together. The NR-PDCCH 455 and NR-PDSCH 460 in the first time slot and the NR-PDCCH 465 and NR-PDSCH 470 in the later time slot may be considered as paging occasions and each paging occasion may include same or different paging information. A third type (i.e. type-C 412) may use a time slot for NR-PDCCH 475 while its associated NR-PDSCH 480 transmission may be indicated in the DCI of the NR-PDCCH 475. In the type-C association 412, the NR-PDCCH 475 associated with the SS block #1 415 may be first transmitted in a time slot. In a next time slot or later time slot, the NR-PDSCH 480 associated with the NR-PDCCH 475 may be transmitted with y ms period which may be indicated in the DCI of the NR-PDCCH 475 or predetermined.

The association type 405, 410, 412 described herein may be determined based on the downlink channel. For example, a first association type (i.e. type-A 405) may be used for MSI and a second association type (i.e. type-B 410) may be used for paging channel. The association type may also be determined based on the frequency band. For example, a first association type (i.e. type-A 405) may be used for above 6 GHz frequency band and a second association type (i.e. type-B 410) may be used for below 6 GHz frequency band.

For the first type (i.e. type-A 405), the cycle of the time slots (e.g., x ms) may be predetermined or configured via a broadcasting signal (e.g., MIB or MSI). For the second type (i.e. type-B 410), the frequency resource allocated for NR-PDSCH 460, 470 may be indicated in the associated NR-PDCCH 455, 465. For the third type (i.e. type-C 412), a WTRU may monitor NR-PDCCH 475 in a time slot which may be aligned with the associated SS block (e.g., SS block #1 415) and its associated NR-PDSCH 480 may be indicated in the DCI of the NR-PDCCH 475. The candidate time offsets for the associated NR-PDSCH 480 may be a time slot which may not be overlapped with SS blocks 430, 435, 440 (or other SS blocks which may not be associated with the NR-PDCCH).

In one embodiment, one or more control channel resource sets (CORESETs) may be configured in a paging time resource, wherein one or more CORESETs may be located in a different frequency resource. A paging frequency resource (e.g., CORESET) of one or more frequency resources (e.g., CORESETs) may be used, determined, or configured for a WTRU or a group WTRU to monitor for a paging message. The paging frequency resource may be determined based on beam-related information.

A paging frequency resource may be determined based on an associated SS block. For example, a modulo operation may be used based on the SS block time index and the number of paging frequency resources. Alternatively or additionally, a paging frequency resource may be determined based on one or more beam indices which may be provided in a broadcasting signal.

In another embodiment, a single SS block may be associated with one or more beams, wherein the number of beams used for a single SS block may be indicated in an associated broadcasting signal. The one or more beams used for an SS block may be referred to as a beam group (or a TX beam group). The number of frequency resources and its associated configuration parameters may be transmitted in system information (e.g., remaining minimum system information (RMSI) or other system information (OSI)).

In another embodiment, an NR-PDCCH resource (e.g., paging resource or DCI) may be common for all SS blocks and the NR-PDCCH resource may be located over multiple SS blocks. The time slot for the associated NR-PDSCH may be indicated in the NR-PDCCH, wherein the candidate time slots for the associated NR-PDSCH may be based on the beam or BPL used for the NR-PDSCH. The time slot for the associated NR-PDSCH may be indicated with the SS block index. For example, if the NR-PDSCH is transmitted with a beam used for an SS block, the SS block index may be indicated in the NR-PDCCH and the SS block index may determine the time slot containing NR-PDSCH.

In yet another embodiment, an NR-PDCCH resource for one or more of minimum SI (MSI), other SI (OSI), RACH, and/or paging may be determined based on at least one of a time offset, a frequency offset, a cycle of the NR-PDCCH resource and the like. The time and frequency offsets may be from the associated SS block. The time and frequency offsets may be indicated in PBCH in the associated SS block. The cycle of the NR-PDCCH resource may be used based on the default cycle (e.g., cycle of SS burst such as 20 ms).

A beam common paging occasion is described herein. A paging frame (or a paging slot, a paging occasion) may be defined, used, or configured in a beam-common manner. Therefore, one or more of POs may be determined or configured for a WTRU irrespective of an SS block selected, used, or determined by the WTRU. The paging frame (PF) may be considered or referred to as a cell-specific paging resource. The paging occasion (PO) may be considered or referred to as a paging resource in which a WTRU may monitor or attempt to receive a paging message.

The time resources for an SS burst may be used or configured for a paging frame. The SS burst may include one or more SS blocks and may be transmitted with a duty cycle. Therefore, the number of paging frames available or used in a time window may be determined based on the duty cycle of the SS burst. For example, if the duty cycle of the SS burst is shorter, a larger number of paging frame may be used.

In a paging frame (or paging occasion), a downlink control information (DCI) which may be used to schedule NR-PDSCH carrying paging message may be transmitted or received over all beams used for SS blocks in an SS burst. For example, if N SS blocks are located in an SS burst, N control channel resource sets (e.g., CORESETs or NR-PDCCH CORESETs) may be used or configured and each CORESET may be associated with an SS block. A WTRU may assume that the DCI may be repetitively transmitted over N CORESETs, wherein the same set of NR-PDCCH candidates (or set of control channel elements (CCEs)) may be used for the repetitive transmission of the DCI.

The subset of NR-PDCCH candidates (e.g., search space, a starting CCE index) in each CORESET may be determined as a function of at least one of following: (1) one or more of cell-specific parameters (e.g., cell-ID, frame number, slot number, etc.); (2) one or more of SS block specific parameters (e.g., SS block time index, parameters indicated in a PBCH of the associated SS block); (3) P-RNTI (e.g., an RNTI used for paging monitoring); (4) one or more of beam-related information (e.g., beam identity index); and (5) a RX beam group (e.g., a WTRU may determine a set of Rx beams for paging reception. The RX beam group for paging monitoring may be the latest RX beam group used before the WTRU falls to an idle mode. If the RX beam group is changed, the WTRU may update the RX beam group index (e.g., using PRACH resource).

A WTRU may determine to monitor a subset of CORESETs for paging monitoring. For example, a WTRU may first determine the subset of CORESETs based on the measurement of SS blocks before it starts monitoring paging or attempting paging reception. The WTRU may then monitor or attempt to receive paging message within the determined subset of CORESET(s). DM-RS of each CORESET may be QCL-ed with SSS and/or DM-RS of PBCH of the associated SS block.

In one embodiment, a DCI for scheduling of a NR-PDSCH carrying a paging message may be used for a direct indication related to system information update. Specifically, a flag bit in the DCI may be used to indicate whether the DCI carries NR-PDSCH scheduling information or direct indication related information. If the flag bit is set to 'TRUE', the rest of DCI bits may be used for direct indication without NR-PDSCH scheduling information. If the flag bit is set to 'FALSE', the rest of DCI bits may be used for NR-PDSCH scheduling. The direct indication may include one or more of following: (1) system information update (e.g., MIB, RMSI update and/or OSI update); (2) the number of SS block in an SS burst change or update; (3) update of SS burst duty cycle; (4) public alarming (e.g., ETWS, CMAS, etc.); (5) configuration for grant-free uplink resources update; and (6) update of a set of uplink resources associated with the set of downlink beams (e.g., SS blocks). If a WTRU received a wake up signal, the WTRU may send beam-related information or selected beam indication by using the set of uplink resource indicated or configured.

In another embodiment, a DCI may be used for NR-PDSCH scheduling, direct indication and beam-related information update. For example, two flag bits may be used in the DCI. The first state of the flag (e.g., '00') may be used to indicate that the DCI carries NR-PDSCH scheduling information. The second state of the flag (e.g., '01') may be used to indicate that the DCI carries direct indication of system information update without NR-PDSCH scheduling information. The third state of the flag (e.g., '10') may be used to indicate that the DCI carries beam-related information update without NR-PDSCH scheduling information. The beam-related information may include at least one of following: (1) the number of SS blocks in an SS burst; (2) SS burst duty cycle; and (3) a set or subset of SS blocks turned off (or on/off SS block status). For example, a BS (e.g., gNB) may dynamically turn on/off of the SS blocks (e.g., beams) and the BS may indicate which SS blocks are on or off. If a WTRU has monitored an SS block which may be turned off, the WTRU may trigger or start one or more of following procedures: new beam search within an SS burst or initial cell search. The beam-related information may further include a TX beam group for common search space (or group-common NR-PDCCH).

A Multi-total radiated power (TRP) based paging occasion is described herein. A WTRU may monitor POs associated with one or more TRPs to provide robustness for the case that one or more beams are blocked in a dynamic manner.

In one embodiment, one or more SS blocks in an SS burst may be associated with a beam. If multiple SS blocks within an SS burst are associated with a beam, the SS blocks may be assumed or considered as QCL-ed in terms of a beam. The SS blocks QCL-ed in terms of a beam may indicate that PSS, SSS, and/or DM-RS of the SS blocks are QCL-ed in terms of one or more QCL parameters (e.g., spatial Rx parameters).

Figure 5:
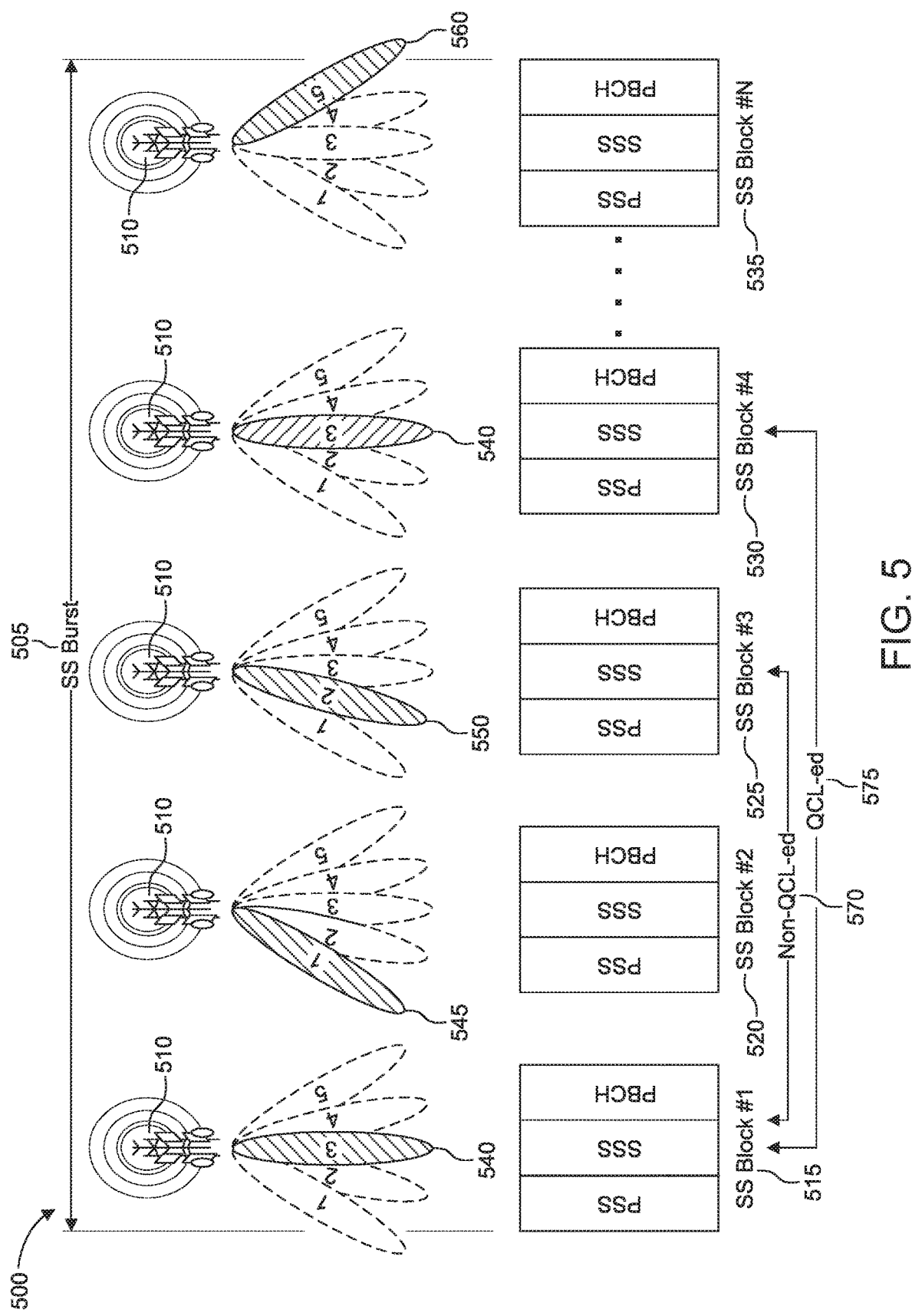
FIG. 5 is a diagram illustrating an example of quasi-co-location (QCL) association between SS blocks in an SS burst.

FIG. 5 illustrates an example 500 of quasi-co-location (QCL) association between SS blocks 515, 520, 525, 530, 535 in an SS burst 505 when multiple SS blocks 515, 530 are associated with a same beam 540, which may be used in any combination of other embodiments described herein. As illustrated in FIG. 5, the SS block #1 515 and SS block #4 530 may be associated with the same beam #3 540. Other SS blocks 520, 525, 535 may be associated with another beam 545, 550, 560. For example, the SS block #2 520 may be associated with a beam #1 545, the SS block #3 525 may be associated with a beam #550, and the SS block #N 535 may be associated with a beam #5 560. As illustrated in FIG. 5, the SS block #1 515 and SS block #4 530 may be considered, assumed, or indicated as QCL-ed 575 at least for a beam (e.g., the beam #3 540). However, the SS block #1 515 and SS block #3 525 may be considered or assumed as non-QCL-ed 570 as different beams (e.g., the beam #3 540 and the beam #2 550) are associated with those SS blocks 515, 525. An SS block 515, 520, 525, 530, 535 (e.g., SSS and/or DM-RS of PBCH in the SS block) and its associated POs (e.g., DM-RS of NR-PDCCH and/or NR-PDSCH for the associated POs) may be QCL-ed. A WTRU may assume that an SS block 515, 520, 525, 530, 535 and its associated POs may be QCL-ed.

In one embodiment, a BS may indicate the QCL association between SS blocks within an SS burst to a WTRU. For example, a subset of SS blocks associated with a same beam may be indicated to a WTRU. Based on the QCL association, the WTRU may combine, accumulate, or use one or more SS blocks within an SS burst for higher accuracy of time/frequency tracking and/or beam measurement. Specifically, a minimum SI may include QCL association between SS blocks. One or more combinations or subsets of SS blocks may be predefined and at least one of the combinations or subsets may be indicated to the WTRU in the minimum SI. Moreover, PBCH in each SS block may include QCL association information. For example, the SS block indices which are used or associated with a same beam may be indicated in the MIB. If the number of SS blocks in an SS burst is Nss, Nss bitmap may be used to indicate which SS blocks are associated with the same beam. One or more subsets of SS blocks may be predefined and at least one of the subsets may be indicated in the MIB.

A same sequence may be used for PSS or SSS to indicate which beam is associated with. For example, a WTRU may detect a sequence used for PSS or SSS for one or more SS blocks. If the same sequence is used for one or more SS blocks in an SS burst, the WTRU may assume that the SS blocks are QCL-ed or the SS blocks are associated with the same beam.

In another embodiment, a beam ID may be indicated in each SS block. As described above, an SS burst may include multiple SS blocks (e.g., up to 64 SS blocks) and each SS block may be associated with a beam. Thus, there may exist multiple beams (e.g., up to 64 beams) associated with the SS blocks. A bit field in a PBCH in an SS block may indicate which beam may be associated with the SS block. For example, 6 bits may be used to indicate a beam ID. This beam ID may be included in PBCH of each SS block. If the beam ID is the same for two or more SS block, the WTRU may assume or consider the two or more SS blocks are QCL-ed or the two or more SS blocks are associated with the same beam. A WTRU may also measure a beam quality from one or more SS blocks associated with the same beam within an SS burst. Since a beam itself is transparent to the WTRU from the WTRU's perspective, the WTRU may measure the quality of beams using downlink signals (e.g., SS blocks). For example, the WTRU may measure 64 beam qualities based on 64 downlink signals for the 64 beams. A CRC of PBCH in each SS block may be masked with a beam ID.

A WTRU monitoring paging occasions (POs) with a beam group is described herein. A PO may be determined based on a beam determined during initial access procedures. A WTRU may monitor POs which may be associated with one or more beams. Specifically, a WTRU may determine a subset of beams (e.g., one or more beams) from downlink signals (e.g., SS blocks). The subset of beams may be associated with multiple SS blocks (e.g., a subset of SS blocks) if the subset of beams includes more than one beam. Each beam in one or more subset of beams may be non-overlapped or partially overlapped. The subset of beams may be interchangeably used with beam tracking area (BTA), beam group, paging beam group, paging beam tracking area, and paging beam subset.

One or more subsets of beams may be predetermined or predefined and a subset of beams may be selected or determined based on a beam quality measurement of SS blocks. For example, a WTRU may measure beam quality of SS blocks in all the subsets of beams and the WTRU may determine an SS block which provides the highest beam quality. The WTRU may then select the subset of beams in which the highest beam quality of the SS block is included (or the SS block corresponding to the highest beam quality). A WTRU may also determine beam-specific POs for each beam within the selected subset of beams on the configuration information.

A WTRU may monitor POs associated with the subset of beams or subset of SS blocks (or beam tracking area associated with the subset of beams or SS blocks). In a first type of monitoring POs, a WTRU may monitor all POs associated with the subset of beams. In a second type of monitoring POs, a WTRU may monitor a subset of POs associated with the subset of beams. Specifically, the subset of POs may be associated with a beam (or a best beam) which may have a highest beam quality within the subset of beams. The type of monitoring POs may be indicated by a network. For example, a network may indicate whether a WTRU may monitor a subset of POs associated with the subset of beams. If not, the WTRU may need to monitor all POs associated with the subset of beams.

Figure 6:
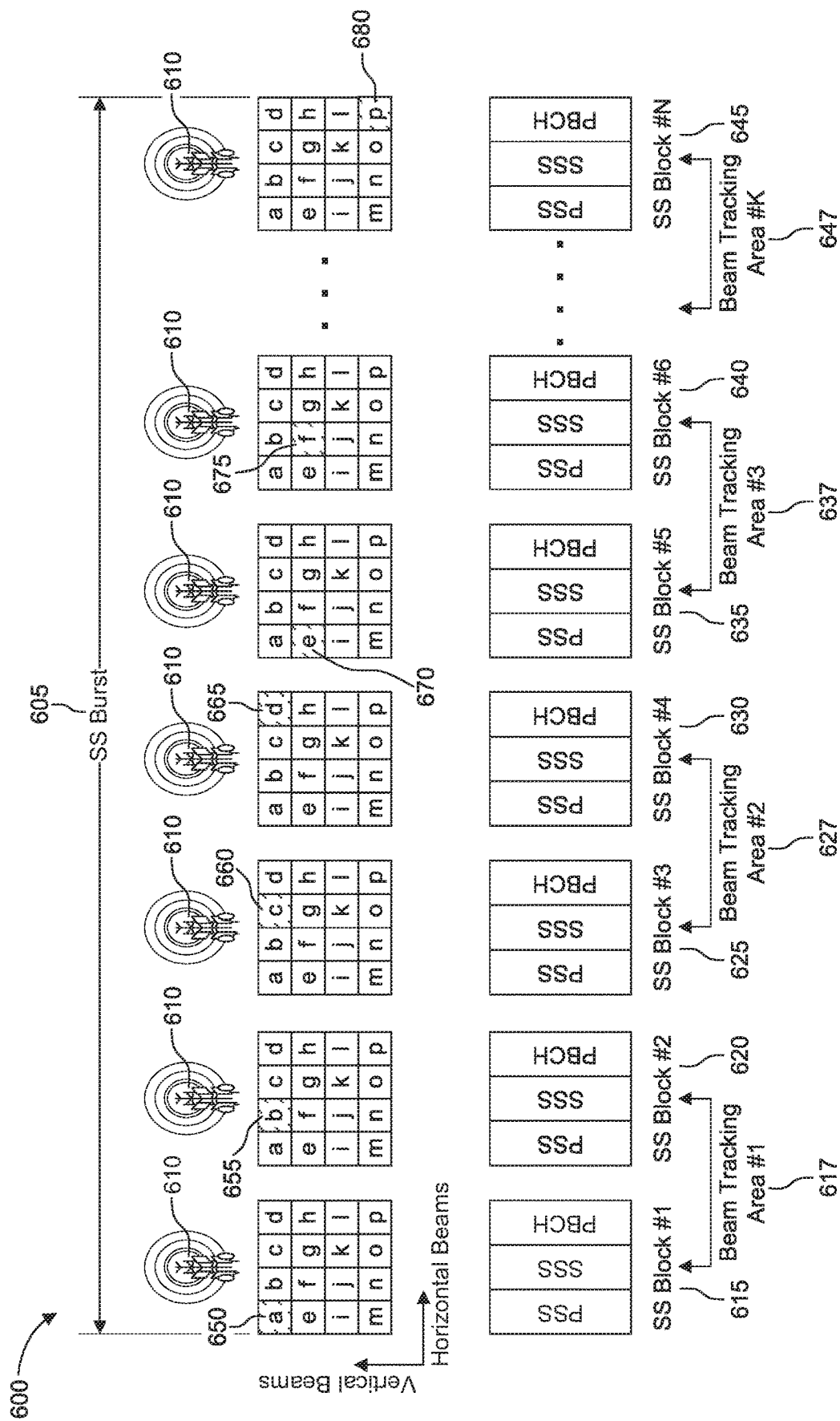
FIG. 6 is a diagram illustrating an example of beam tracking areas (BTAs) for paging monitoring in an SS burst.

FIG. 6 illustrates an example 600 of beam tracking areas (BTAs) 617, 627, 637, 647 for paging monitoring in an SS burst 605, which may be used in any combination of other embodiments described herein. As illustrated in FIG. 6, a BS 610 may transmit multiple beams (i.e. beam a 650, beam b 655, beam c 660, beam d 665, beam e 670, beam f 675, and beam p 680). Each beam 650, 655, 660, 665, 670, 675, 680 may be spaced based on vertical/horizontal domain. For example, the beam a 650 may be directed at 90 degree vertical and 0 degree horizontal. The beam c 660 may be directed at 90 degree vertical and 60 degree horizontal. Thus, the beam a 650 and beam c 660 may be placed at the same vertical domain, but different horizontal domain. Similarly, the beam e 670 may be directed at 60 degree vertical and 0 degree horizontal. In this case, the beam a 650 and beam e 670 may be placed at the same horizontal domain, but different vertical domain.

As described above, each beam 650, 655, 660, 665, 670, 675, 680 may be associated with its respective SS block 615, 620, 625, 630, 635, 640, 645. For example, as illustrated in FIG. 6, the beam a 650 may be associated with SS block #1 615 and the beam b 655 may be associated with SS block #2 620. Similarly, the beam f 675 may be associated with SS block #6 640 and the beam p 680 may be associated with SS block #N 645. One or more SS blocks 615, 620, 625, 630, 635, 640, 645 (or one or more beams 650, 655, 660, 665, 670, 675, 680) may also be grouped into a subset of SS blocks (or a subset of beams) based on beam tracking area 617, 627, 637, 647. For example, the SS block #1 615 and SS block #2 620 may be grouped into a first subset of SS blocks that corresponds to beam tracking area #1 617. Since the SS block #1 615 is associated with the beam a 650 and the SS block #2 620 is associated with the beam b 655, the subset of beams including the beam a 650 and b 655 may be interchangeably referred to as beam tracking area #1 617. Similarly, the SS block #3 625 and SS block #4 630 may be grouped into a second subset of SS blocks that corresponds to beam tracking area #2 627. The SS block #5 635 and SS block #6 640 may be grouped into a third subset of SS blocks that corresponds to beam tracking area #3 637. Thus, an SS burst 605 may include K number of beam tracking area (from beam tracking area #1 617 to beam tracking area #K 647) based on the number of SS blocks 615, 620, 625, 630, 635, 640, 645 and/or the number of beams 650, 655, 660, 665, 670, 675, 680. As used herein, the term beam tracking area may be interchangeably used with beam tracking area number or beam tracking area index throughout this disclosure.

In one embodiment, a beam tracking area index may be used and each SS block may include beam tracking area information. For example, the PBCH in an SS block may include beam tracking area index. Specifically, the number of beam tracking areas may be determined based on the number of beams used in an SS burst. The number of SS blocks in an SS burst may also be used to determine the number of beam tracking areas. The beams in a beam tracking area may also be localized in the spatial domain (e.g., vertical and/or horizontal) as described above. Lastly, the beams in a beam tracking area may be evenly distributed in the spatial domain.

Figure 7:
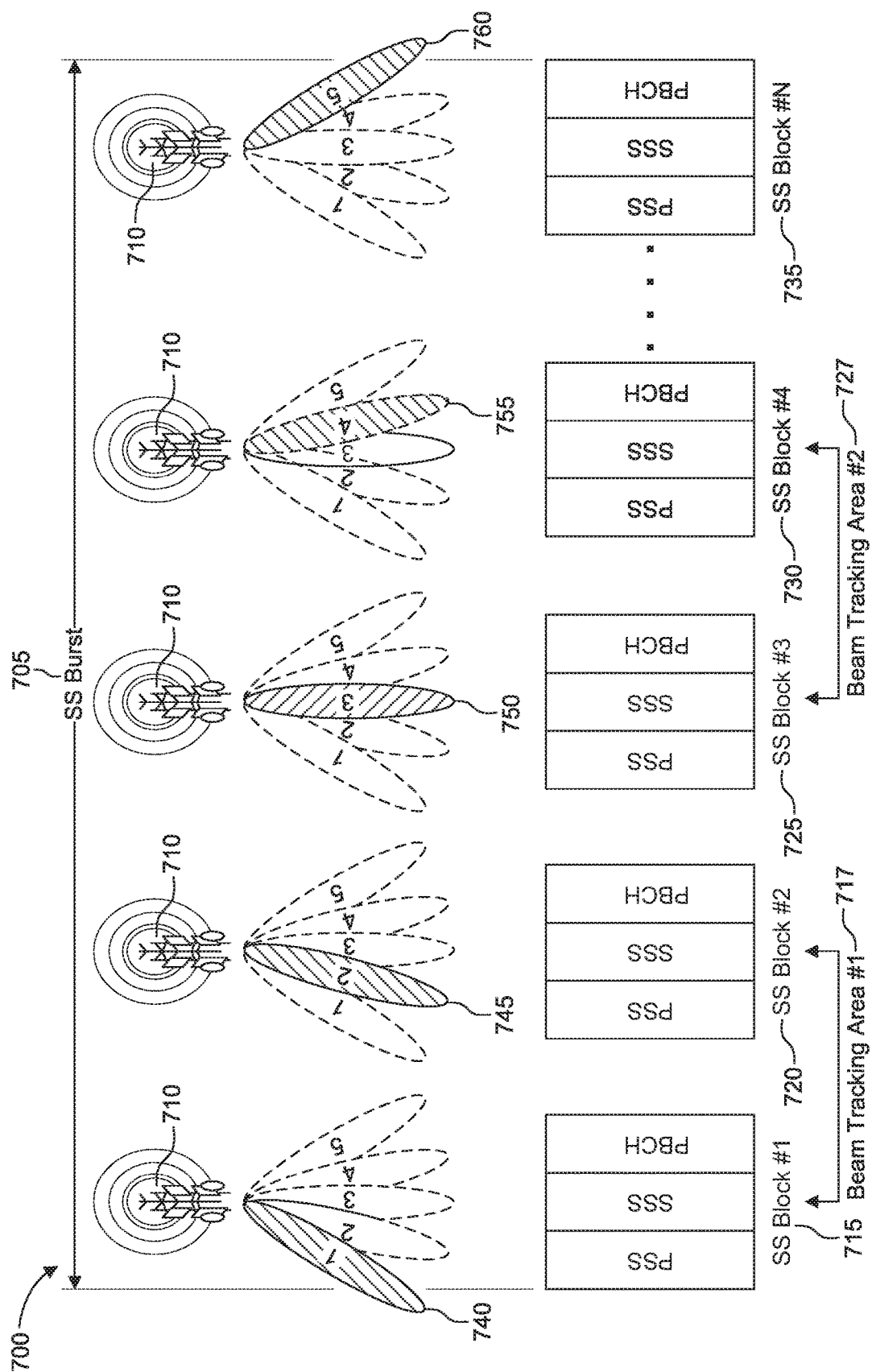
FIG. 7 is a diagram illustrating another example of BTAs for paging monitoring in an SS burst.

FIG. 7 illustrates another example 700 of beam tracking areas (BTAs) 717, 727 for paging monitoring in an SS burst 705, which may be used in any combination of other embodiments described herein. As illustrated in FIG. 7, the BS 710 may have N SS blocks in an SS burst 705 and each SS block may be associated with a beam (e.g., 740, 745, 750, 755, 760). Although it is not shown in FIG. 7, the BS 710 may use up to N (e.g., N=64) beams in an SS burst 705. Each beam 740, 745, 750, 755, 760 may occupy one time unit to transmit one paging resource (e.g., paging DCI) over PDCCH. This means that the BS 710 may transmit a same paging resource 5 times over the 5 beams 740, 745, 750, 755, 760 to the WTRU to indicate the control channel (e.g., PDCCH) that the WTRU needs to monitor for paging message.

As illustrated in FIG. 7, each beam 740, 745, 750, 755, 760 may be associated with its respective SS block 715, 720, 725, 730, 735. For example, the beam1 740 and beam2 745 may be associated with SS block #1 715 and SS block #2 720, respectively. The SS block #1 715 and SS block #2 720 may be grouped into a first subset of SS blocks that corresponds to beam tracking area #1 717. Similarly, the beam3 750 and beam4 755 may be associated with SS block #3 725 and SS block #4 730, respectively. The SS block #3 725 and SS block #4 730 may be grouped into a second subset of SS blocks that corresponds to beam tracking area #2 727. Although it is not shown in FIG. 7, the WTRU may be configured with multiple subsets of SS blocks associated with multiple beams. For example, if the BS 710 sweeps 64 beams in an SS burst 705, there may be 8 subsets of SS blocks. In this case, each of the 8 subsets of SS blocks may comprise 8 SS blocks that corresponds to its respective BTA. A set of SS blocks may comprise all the subsets of SS blocks including the first and second subsets of SS blocks. As used herein, the set of SS blocks may be interchangeably used with a group of SS blocks. The subset of SS blocks may be interchangeably used with a subgroup of SS blocks.

In one embodiment, the WTRU may receive, from the BS 710, paging resource and beam tracking area (BTA) configuration associated with the paging resource. The BTA configuration may include, but are not limited to, the number of BTAs 717, 727, and association information between: (1) the BTA 717, 727 and SS blocks 715, 720, 725, 730, 735, (2) the BTA 717, 727 and subsets of SS blocks, (3) the BTA 717, 727 and beams 740, 745, 750, 755, 760; or (4) the BTA 717, 727 and paging resources associated with the beams 740, 745, 750, 755, 760 (or SS blocks 715, 720, 725, 730, 735). The BTA configuration may be transmitted in a broadcasting message such as system information block (SIB), an RRC message or the like. The WTRU may receive the paging resource and BTA configuration while the WTRU is in idle mode (e.g., RRC idle) or in connected mode (e.g., RRC connected).

Once the WTRU receives the paging resource and BTA configuration, the WTRU may monitor quality of beams 740, 745, 750, 755, 760 based on downlink signal. For example, the quality of beams 740, 745, 750, 755, 760 may be measured based on reference signal received power (RSRP), received signal strength indicator (RSSI), reference signal received quality (RSRQ), signal to interference plus noise ratio (SINR), hypothetical block error rate (BLER) of PDCCH, or the like. The WTRU may perform the beam quality measurements for all the SS blocks 715, 720, 725, 730, 735 associated with the beams 740, 745, 750, 755 760. The WTRU may then select an SS block within all the SS blocks 715, 720, 725, 730, 735 based on the beam quality measurements. For example, if the SS block #1 715 has the highest beam quality among all the SS blocks 715, 720, 725, 730, 735 or meets the predetermined beam quality requirement, the WTRU may select the SS block #1 715 for its best quality beam. The WTRU may then determine the BTA number (i.e. first BTA) associated with the selected SS block (or the subset of SS blocks that includes the selected SS block) based on the BTA configuration. For example, if the SS block #1 715 is selected for its highest quality beam, the WTRU may determine the BTA #1 717 to monitor the paging resource associated with the SS block #1 715 (i.e. beam1 740). Alternatively or additionally, if the WTRU selects the first subset of SS blocks that includes the SS block #1 715 as the beams that include the highest quality beam, the WTRU may determine the BTA #1 717 to monitor the paging resources associated with both the SS block #1 715 and SS block #2 720 (i.e. beam1 740 and beam2 745).

As described above, after determining the BTA number 717, 727, the WTRU may monitor paging resources (e.g., paging DCI) associated with one or more SS blocks 715, 720, 725, 730, 735. In this case, the WTRU may reduce the number of SS blocks that the WTRU needs to monitor for paging resources by monitoring the SS blocks 715, 720, 725, 730, 735 (or subset of SS blocks) that corresponds to the determined BTA number 717, 727. For example, if a WTRU determines the BTA #1 717 as the BTA to monitor paging resources, the WTRU may only need to monitor PDCCHs associated with the SS block #1 715 and the SS block #2 720. If the WTRU receives DCI with P-RNTI from the PDCCH associated with the SS block #1 717 or the SS block #2 720, the WTRU may demodulate PDSCH resource blocks indicated by the DCI. The WTRU may then decode the paging message (or PCH) carried on the PDSCH associated with DCI. Since the number of beams 740, 745, 750, 755, 760 or SS blocks 715, 720, 725, 730, 735 that the WTRU needs to monitor is reduced by using the BTA 717, 727, the WTRU may save its battery consumption and extend the batter duration.

While monitoring the paging resources associated with the selected beams 740, 745, 750, 755, 760 or selected SS blocks 715, 720, 725, 730, 735 based on the determined BTA number 717, 727, if the beam quality of the selected SS blocks 715, 720, 725, 730, 735 falls below a predetermined threshold or does not meet the predetermined beam quality requirement, the WTRU may trigger a BTA update procedure to indicate the BS 710 a new candidate BTA or updated BTA. For example, if a WTRU initially selects BTA #1 717 (i.e. SS block #1 715 and SS block #2 720) for paging resource monitoring but the qualities of beams associated with the SS block #1 715 and SS block #2 720 fall below a predetermined threshold, the WTRU may initiate beam quality measurements for all the SS blocks 715, 720, 725, 730, 735 in the SS burst 705 or part of the SS blocks 715, 720, 725, 730, 735 such as neighboring SS blocks (e.g., SS block #3 725 and SS block #4 730). Based on the beam quality measurements for other SS blocks 715, 720, 725, 730, 735, the WTRU may select another SS block (or a subset of SS blocks) that includes the highest quality of beam or meets the beam quality requirement. For example, if the WTRU selects the SS block #4 730 as the highest quality beam, the WTRU may determine BTA #2 727 as the BTA to be updated for paging resource monitoring. The WTRU may then monitor paging resources associated with the updated BTA (i.e. BTA #2 727) or the SS block #3 725 and SS block #4 730. The SS blocks associated with the updated BTA (i.e. SS block #3 725 and SS block #4 730) may be referred to as a second subset of SS blocks. The predetermined threshold may be received from a BS 710 in a broadcasting message such as system information block (SIB), an RRC message or the like.

In order to indicate the updated BTA (i.e. second BTA) to the BS 710, the WTRU may use a random access channel (RACH) procedure. For example, the WTRU may transmit a signal (e.g., PRACH preamble) associated with the updated BTA. The signal may include a physical random access channel (PRACH) resource of the SS blocks 715, 720, 725, 730, 735 that are associated with the updated BTA (e.g., a second subset of SS blocks). The PRACH resource may include time and frequency resources for the SS blocks 715, 720, 725, 730, 735 associated with the updated BTA. The PRACH resource may be determined from PRACH configuration information received in a broadcasting message (e.g., SIB) from the BS 710. The PRACH configuration information received from the BS 710 may include association information between the PRACH resources and the SS blocks 715, 720, 725, 730, 735.

Once the BS 710 received the signal indicating the updated BTA (i.e. second BTA), the BS 710 may determine which beam has the best quality to the WTRU and select one or more beams 740, 745, 750, 755, 760 to transmit paging messages. Specifically, the BS 710 may select the SS blocks (i.e. the second subset of SS blocks) associated with the updated BTA to transmit paging resources (e.g., DCI) over the PDCCHs. Using the updated BTA, the WTRU may monitor the SS blocks (i.e. the second subset of SS blocks) associated with the updated BTA. If the WTRU receives DCI with P-RNTI from the PDCCHs associated with the updated BTA, the WTRU may demodulate PDSCH resource blocks indicated by the DCI and decode the paging message (or PCH) carried on the PDSCH.

As described above, a WTRU may monitor beam quality of the associated beam tracking area (BTA) based on a downlink signal (e.g., SS blocks associated with the BTA). Specifically, a WTRU may monitor beam quality of the associated BTA in each PO. The BTA may include one or more beams (e.g., one or more SS blocks). If the beam quality of all beams in a BTA is below a threshold, a WTRU may determine or declare as beam failure of the BTA. The beam quality may be based on reference signal received power (RSRP) of the SS blocks associated with the BTA (e.g., RSRP measured from SSS and/or PBCH in the SS blocks) or the like. The threshold may be a predefined or a predetermined value.

If a WTRU determined or declared beam failure of the BTA, the WTRU may search a new candidate of BTA which meets the beam quality requirement. If a new candidate of BTA is found, the WTRU may change to new candidate of BTA; the WTRU may indicate or report the BTA change to the network. If a new candidate of BTA is not found, the WTRU may trigger or perform initial access procedure.

A BTA change indication or notification may be performed or used based on at least one of PRACH resources, WTRU-ID, grant-free UL transmission resources, or the like. Specifically, a set of PRACH resources may be reserved for BTA change indication or notification. Each PRACH resource may be associated with a BTA; a WTRU may determine a PRACH resource which may be associated with determined or changed BTA. The set of PRACH resources may be dedicated to a WTRU. The set of PRACH resources may also be configured per BTA.

The WTRU-ID may be included or indicated when a WTRU transmit PRACH for BTA change indication. A WTRU may transmit a PUSCH associated with the PRACH, wherein the PUSCH may include the WTRU-ID; for example, the WTRU-ID may be IMSI, s-TMSI, modulo of IMSI or s-TMSI, or the like. The PUSCH associated with the PRACH may be transmitted in a predetermined time/frequency resources which may be dedicated to each PRACH resources configured for BTA change indication or notification.

A set of the grant-free UL transmission resources may be used for BTA change indication or notification. A grant-free UL transmission resource may comprise at least one of a sequence (e.g., PRACH sequence), data (e.g., PUSCH), and uplink control (e.g., PUCCH). A WTRU may monitor a BS (e.g., gNB) confirmation. For example, after a WTRU send BTA change indication or notification, the WTRU may monitor PDCCH or NR-PDCCH for the confirmation of BTA change in the determined or changed BTA.

In one embodiment, a beam related information for a WTRU may be stored at a network (e.g., MME or gNB). For example, the latest beam related information for a WTRU may be stored in a network for paging when the WTRU switched from RRC connected mode to RRC idle mode. The latest beam related information may include at least one of SS blocks, beam-ID, or beam group ID. The SS block(s) may be associated with BTA. When a WTRU is paged, MME may provide beam-related information for the WTRU to a gNB within a paging tracking area.

In another embodiment, a BS (e.g., gNB) may trigger beam reporting for paging transmission. For example, a common DCI or a group-common DCI may be transmitted or monitored in a common PDCCH or common NR-PDCCH which may be used for all beams (or all BTAs), wherein the DCI may indicate or trigger a beam reporting from a WTRU or a group of WTRUs.

The DCI may include a bit field which may trigger a beam reporting from a WTRU or a group of WTRUs. The group of WTRUs may be determined based on the associated SS block. For example, WTRUs monitoring POs associated with an SS block may be determined as a group of the WTRU. If the DCI triggers beam reporting, the WTRUs monitoring POs associated with the same SS block may report beams. A set of PRACH resources may be used for beam reporting and the set of PRACH resources to use may be indicated in the DCI. For example, one or more sets of PRACH resources for beam reporting may be preconfigured or predefined and one of the set may be indicated in the DCI when a beam reporting is triggered.

The DCI may also be monitored or received in a common paging occasion (PO) which may be monitored by all WTRUs. The time/frequency resource of the common PO may be configured or determined based on one or more of paging cycle or cell-specific parameters. The paging cycle may be configured via broadcasting. Examples of the cell-specific parameters may include, but are not limited to, a cell-ID, slot length, slot number, frame number, and the like.

Figure 8:
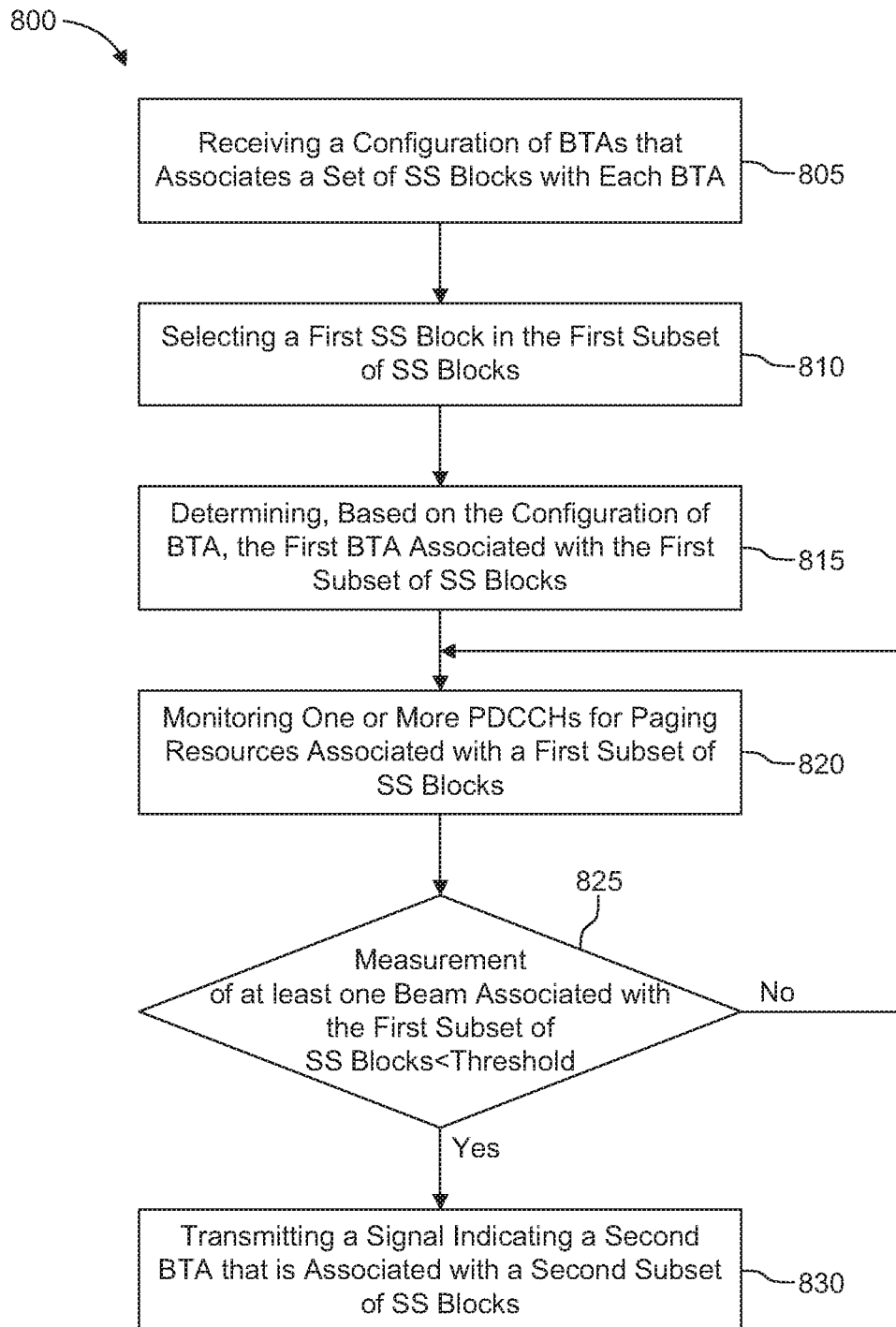
FIG. 8 is a diagram illustrating an example procedure for updating BTA for paging monitoring.

FIG. 8 illustrates an example procedure 800 for updating beam tracking area (BTA) for paging monitoring. For example, at step 805, a WTRU may receive, from a base station (BS), a configuration of beam tracking areas (BTAs) that associates a set of synchronization signal (SS) blocks with each BTA. The set of SS blocks may comprise one or more subsets of SS blocks. A subset of SS blocks may include one or more SS blocks. An SS block in the set (or subset) of SS blocks may include a primary synchronization signal (PSS), a secondary synchronization signal (SSS), and a physical broadcasting channel (PBCH) associated with the SS block. The WTRU may receive, via the PBCH associated with the SS block, a master information block (MIB) that includes a configuration of the SS block such as SS block number and subsequent control channel to further receive broadcasting messages associated with the SS block. The configuration of BTAs may include a number of BTAs, association information between each of the BTAs and each of the SS blocks, association information between each of the BTAs and each of the subset of SS blocks, and/or association information between the BTAs and the set of SS. The configuration of BTAs may be transmitted in a broadcasting message such as master information block (MIB), system information block (SIB), an RRC message, or the like.

At step 810, the WTRU may select, based on measurements of beams associated with the SS blocks in the set of SS blocks, a first SS block in a first subset of SS blocks. For example, the WTRU may measure the quality of beams associated with the SS blocks in the set of SS blocks based on RSRP, RSSI, RSRQ, SINR, hypothetical block error rate (BLER) of PDCCH or the like. If the WTRU finds an SS block that has the highest quality of beam or meets a quality requirement, the WTRU may select the SS block as the first SS block. The first SS block may be included in the first subset of SS blocks.

At step 815, the WTRU may determine, based on the configuration of BTAs, the first BTA associated with the first subset of SS blocks. For example, since the first SS block is selected for its highest quality beam, the WTRU may determine the first subset of BTAs as the BTA (i.e. first BTA) to monitor the paging resource. The WTRU may recognize the association between the first subset of BTAs and the first BTA based on the configuration of BTAs.

At step 820, the WTRU may monitor one or more physical downlink control channels (PDCCHs) for paging resources (e.g., DCI) associated with the first subset of SS blocks that corresponds to the first BTA. If at least one measured quality of at least one beam associated with the first subset of SS blocks is less than a predetermined threshold (or does not meet a beam quality requirement) at step 825, the WTRU may transmit, to a base station (BS), a signal indicating a second BTA (i.e. updated BTA) that is associated with a second subset of SS blocks at step 830. The WTRU may determine, based on at least one measurement of at least one beam associated the set of SS blocks, a second SS block in the second subset of SS blocks. The second SS block may be associated a beam that has the highest beam quality or meets a quality requirement among the set of SS blocks. However, if the measured qualities of all beams associated with the first subset of SS blocks is greater than the predetermined threshold at step 825, the WTRU may keep monitoring one or more PDCCHs for paging resources (e.g., DCI) associated with the first subset of SS blocks that corresponds to the first BTA at step 820.

The signal indicating the second BTA (or updated BTA) may include a physical random access channel (PRACH) resource associated with the second subset of SS blocks that corresponds to the second BTA. The PRACH resources associated with the second BTA may be selected based on a predetermined configuration (e.g., PRACH configuration information). Upon transmitting the second BTA, the WTRU may receive, from the BS, one or more paging resources (e.g., paging DCI) associated with the second BTA over PDCCH. Upon receiving the one or more paging resources, the WTRU may receive, from the BS, a paging message (or PCH) based on the one or more paging resources.

The paging channel has been used for other objectives than paging message transmission. For example, the paging channel may be used for system information update indication such as SI update, ETWS, CMAS, extended access barring (EAB), or the like. However, in a beam-based system, the SI update may include beam common SIs and beam-specific SIs. When a beam-specific SI is updated, triggering SI update for all WTRUs may result in unnecessary WTRU battery consumption as those WTRUs not monitoring the beam of which information is updated. In order not to wake up WTRUs that are monitoring beams of which the system information has not been updated, a separate SI update indication for beam common SI and beam-specific SI may be needed. If a WTRU received beam common SI update indication, the WTRU may receive the updated SI for the beam common system information. If a WTRU received beam-specific SI update indication, the WTRU may receive the updated SI for the beam-specific system information.

In one embodiment, one or more types of SI update indication may be used. For example, a first type of SI update indication (e.g., type-1 SI) may be used to update a first subset of SI which may be beam common information. A second type of SI update indication (e.g., type-2 SI) may be used to update a second subset of SI which may be beam specific information.

Specifically, the first type of SI update indication (e.g., type-1 SI) may be transmitted in DCI in a common PO. The first type of SI update indication may be used to update beam common system information and a WTRU may monitor the DCI regardless of the associated SS block for beam-specific PO configured or determined. The common PO may be transmitted using a beam sweeping, wherein DCI may be transmitted with one or more beams corresponding to SS blocks in an SS burst. The common PO may also be transmitted in a time/frequency resource that may be mutually exclusive to a time/frequency resource for beam-specific POs. The periodicity of time and frequency resources for the common PO may be explicitly configured by a broadcasting signal. For example, the time and frequency resources may be indicated based on the start or end of an SS burst. The time and frequency resources may be indicated with offsets from the start or end of an SS burst, or a specific SS block (e.g., the first SS block). Each SS block may indicate the same time and frequency resources for the common PO with a different time and frequency offsets. A bit flag may be used for the DCI to indicate whether the DCI carries its associated PDSCH scheduling information or type-1 SI update indication. When the DCI carries type-1 SI update indication, no PDSCH scheduling information may be transmitted in the DCI.

The second type of SI update indication (e.g., type-2 SI) may be transmitted in DCI in a beam-specific PO. The second type of SI update indication may be used for beam-specific SI and a WTRU may monitor the DCI when the WTRU is determined to monitor the beam-specific PO. Specifically, each SS block may be associated with a beam and may have its associated POs, wherein the DCI for type-2 SI update indication may be monitored or received in the associated PO. A bit flag may be used for the DCI to indicate whether the DCI carries its associated PDSCH scheduling information or type-2 SI update indication. When the DCI carries type-2 SI update indication, no PDSCH scheduling information may be transmitted in the DCI.

In another embodiment, DCI in a common PO may be used to indicate both first and second types of SI update indications. For example, DCI in a common PO may include a type-1 SI update indication field and a type-2 SI update indication field. A WTRU may monitor the DCI to reacquire the corresponding SI if updated. If the type-1 SI update indication indicates the type-1 SI update, all WTRUs may reacquire the corresponding SI. If the type-2 SI update indication indicates the type-2 SI updates, a WTRU may reacquire the corresponding SI if the updated SI is associated with the current serving beam (e.g., SS blocks associated with beam-specific POs).

The DCI in a common PO may carry type-1 SI update indication and/or type-2 SI update indication field. In an example, an RNTI may be used to indicate which Type of SI update indication is transmitted in the DCI. For example, a first RNTI may be used to scramble CRC of the DCI if a type-1 SI update indication is transmitted. A second RNTI may be used to scramble CRC of the DCI if a type-2 SI update indication is transmitted. In another example, a type-1 SI update indication may be transmitted in the DCI with a type-2 SI update indication associated with a beam or a beam tracking area (BTA). For example, one or more type-2 SI update indications may be used for one or more beams or BTAs. In addition, the DCI may carry type-2 SI update indication of a beam or a BTA which may be indicated at least one of an RNTI, type-I SI update indication, and the like. The RNTI that may be used to scramble CRC of the DCI may indicate which beam or BTA associated with the type-2 SI update indication. The beam or BTA may be associated with SS block(s). The type-1 SI update indication may be located in the DCI irrespective of which beam or BTA associated with the type-2 SI update indication.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:

receiving a plurality of synchronization signal (SS) blocks comprised in a SS burst;

selecting a SS block of the plurality of SS blocks, wherein a subset of PDCCH candidates of a paging occasion (PO) are associated with the selected SS block, the PDCCH candidates of the PO being associated with a common search space;

receiving a physical downlink control channel (PDCCH) transmission that corresponds to one of the PDCCH candidates in the subset of PDCCH candidates, wherein the PDCCH transmission comprises downlink control information (DCI), and the DCI comprises scheduling information for a paging message; and receiving the paging message via a physical downlink shared channel (PDSCH) transmission in accordance with the scheduling information comprised in the DCI.

2. The method of claim 1, wherein the subset of PDCCH candidates is determined based on an SS block time index associated with the selected SS block.

3. The method of claim 1, wherein the selected SS block and the subset of PDCCH candidates are associated with a common transmission beam.

4. The method of claim 1, wherein each of the PDCCH candidates is associated with respective control channel elements (CCEs).

5. The method of claim 1, wherein each of the plurality of SS blocks in the SS block burst is associated with a respective subset of PDCCH candidates of the PO.

6. The method of claim 1, further comprising:

selecting the SS block based on measurements of the plurality of SS blocks comprised in the SS burst.

7. The method of claim 1, wherein the DCI comprises an indication of a system information update.

8. The method of claim 1, wherein the PO is determined based on a WTRU ID.

9. The method of claim 1, wherein each of the plurality of SS blocks comprises a primary synchronization signal (PSS), a secondary synchronization signal (SSS), and a physical broadcasting channel (PBCH) transmission.

10. A wireless transmit/receive unit (WTRU) comprising:
a transceiver; and
a processor,
the transceiver and the processor configured to:
receive a plurality of synchronization signal (SS) blocks comprised in a SS burst;
select a SS block of the plurality of SS blocks, wherein a subset of PDCCH candidates of a paging occasion (PO) are associated with the selected SS block, the PDCCH candidates of the PO being associated with a common search space;
receive a physical downlink control channel (PDCCH) transmission that corresponds to one of the PDCCH candidates in the subset of PDCCH candidates, wherein the PDCCH transmission comprises downlink control information (DCI), and the DCI comprises scheduling information for a paging message; and
receive the paging message via a physical downlink shared channel (PDSCH) transmission in accordance with the scheduling information comprised in the DCI.

11. The WTRU of claim 10, wherein the subset of PDCCH candidates is determined based on an SS block time index associated with the selected SS block.

12. The WTRU of claim 10, wherein the selected SS block and the subset of PDCCH candidates are associated with a common transmission beam.

13. The WTRU of claim 10, wherein each of the PDCCH candidates is associated with respective control channel elements (CCEs).

14. The WTRU of claim 10, wherein each of the plurality of SS blocks in the SS block burst is associated with a respective subset of PDCCH candidates of the PO.

15. The WTRU of claim 10, wherein the transceiver and the processor are further configured to:
select the SS block based on measurements of the plurality of SS blocks comprised in the SS burst.

16. The WTRU of claim 10, wherein the DCI comprises an indication of a system information update.

17. The WTRU of claim 16, wherein the PO is determined based on a WTRU ID.

18. The WTRU of claim 10, wherein each of the plurality of SS blocks comprises a primary synchronization signal (PSS), a secondary synchronization signal (SSS), and a physical broadcasting channel (PBCH) transmission.

* * * * *